(12) United States Patent
Bader

(10) Patent No.: US 10,336,638 B1
(45) Date of Patent: *Jul. 2, 2019

(54) VERTICAL INTEGRATION OF SOURCE WATER DESALINATION

(71) Applicant: Mansour S. Bader, College Station, TX (US)

(72) Inventor: Mansour S. Bader, College Station, TX (US)

(*) Notice: Subject to any disclaimer, the term of this patent is extended or adjusted under 35 U.S.C. 154(b) by 110 days.

This patent is subject to a terminal disclaimer.

(21) Appl. No.: 15/731,626

(22) Filed: Jul. 10, 2017

Related U.S. Application Data

(63) Continuation-in-part of application No. 13/999,309, filed on Feb. 8, 2014, now Pat. No. 9,701,558.

(51) Int. Cl.

| | |
|---|---|
| C02F 9/00 | (2006.01) |
| B01D 3/06 | (2006.01) |
| B01D 3/00 | (2006.01) |
| B01D 53/14 | (2006.01) |
| C02F 1/20 | (2006.01) |
| C02F 5/02 | (2006.01) |
| C02F 101/10 | (2006.01) |
| C02F 103/08 | (2006.01) |
| C02F 103/18 | (2006.01) |
| C02F 1/06 | (2006.01) |
| C02F 1/04 | (2006.01) |

(52) U.S. Cl.
CPC ............... *C02F 9/00* (2013.01); *B01D 3/007* (2013.01); *B01D 3/06* (2013.01); *B01D 53/1481* (2013.01); *B01D 2252/103* (2013.01); *C02F 1/042* (2013.01); *C02F 1/06* (2013.01); *C02F 1/20* (2013.01); *C02F 5/02* (2013.01); *C02F 2101/10* (2013.01); *C02F 2101/101* (2013.01); *C02F 2103/08* (2013.01); *C02F 2103/18* (2013.01); *C02F 2301/043* (2013.01); *C02F 2303/10* (2013.01); *C02F 2303/22* (2013.01)

(58) Field of Classification Search
CPC ........................................................ C02F 9/00
USPC ............ 210/652, 649, 703, 665; 203/11, 12; 202/174
See application file for complete search history.

(56) References Cited

U.S. PATENT DOCUMENTS

| | | |
|---|---|---|
| 3,301,633 A | 1/1967 | Stowe |
| 3,366,451 A | 1/1968 | Waldron, Jr. |
| 6,365,051 B1 | 4/2002 | Bader |
| 7,093,663 B1 | 8/2006 | Bader |
| 7,501,065 B1 | 3/2009 | Bader |
| 7,789,159 B1 | 9/2010 | Bader |
| 7,934,551 B1 | 5/2011 | Bader |
| 7,963,338 B1 | 6/2011 | Bader |
| 8,197,696 B1 * | 6/2012 | Bader ...................... C02F 1/66 210/639 |

(Continued)

*Primary Examiner* — Nina Bhat

(57) ABSTRACT

There is provided herein a system and method for effectively de-scaling source water and producing useful inorganic compounds. As a result of the effective de-scaling, a much needed effective desalination system and method is also provided, which maximizes distillate production, minimizes operating costs, reduces reject brine and produces scale-depleted reject brine. Yet, as a result of the effective de-scaling, an effective flue gas scrubbing system and method is further provided, which not only aids in protecting the environment but also aids in enhancing the performance of the effective desalination system and method.

21 Claims, 20 Drawing Sheets

(56) References Cited

U.S. PATENT DOCUMENTS

| | | |
|---|---|---|
| 8,915,301 B1 | 12/2014 | Bader |
| 8,961,916 B1 | 2/2015 | Bader |
| 9,045,351 B2 | 6/2015 | Wallace |
| 9,701,558 B1 | 7/2017 | Bader |
| 2012/0267315 A1* | 10/2012 | Soane ............... C02F 1/5236 210/714 |
| 2014/0014584 A1* | 1/2014 | Cone ..................... C02F 9/00 210/652 |

* cited by examiner

*Configuration A:*

*Configuration B:*

*Configuration C:*

*Configuration A:*

*Configuration B:*

VERTICAL INTEGRATION OF SOURCE WATER DESALINATION

BACKGROUND OF THE INVENTION

Seawater and the Like

Seawater is nearly a uniform saline stream in terms of ions content except seasonal temperature fluctuations and algae bloom. However, the ions content may increase in situations where very large amounts of reject streams from de-salting methods are blown back to a sea, especially in a bay or a semi-closed sea. De-salting methods are not Zero-Liquid Discharge (ZLD), but rather feed stream splitters wherein the ions content in the feed stream is, to a varying degree depending on the de-salting method, reduced in the product stream but elevated in the reject stream. The discharge of enormous volumes of reject streams from de-salting methods elevates total dissolved solids (TDS), including scale prone species, around the seawater intake lines, particularly when the dispersion of reject streams is not fast enough. This, in turn, has a detrimental effect on de-salting methods. Yet, reject streams are depleted of dissolved oxygen, and enriched with residues of oxygen scavengers, potential toxic species (e.g., derivatives of boron, chlorine and bromine) and gypsum; which adversely affect marine environment.

Other forms of reject streams may also result from using seawater in flue gas de-sulfurization on: a once-through basis relying on the natural alkalinity of seawater as a scrubbing agent; a once-through basis relying on activating magnesium in seawater as a scrubbing agent; or a recycle-bleed basis utilizing seawater as a makeup water. Such reject streams are also depleted of dissolved oxygen and enriched with gypsum. Table 1 presents samples of seawater and reject streams from de-salting and partially de-salting methods including reverse osmosis (RO), multi-stage flash desalination (MSF), and nanofiltration (NF) as well as a flue gas de-sulfurization method. The term "reject stream" may also refer to as "concentrate stream", "reject brine", "spent seawater" or "spent water".

The profound reason for generating staggering volumes of reject streams from, for example, de-salting seawater is the aqueous solubility limits of the three hydrates of calcium sulfate (dihydrate or gypsum, hemihydrate and anhydrite). The saturation envelops of such hydrates directly control the recovery ratio of any de-salting method, cause enormous engineering difficulties, and hinder water production at a low cost. Within certain temperature confines, such hydrates: (1) are all metastable; (2) have inverse solubilities with increasing temperatures except gypsum below 40° C.; (3) have solubility patterns in which the solubility increases with increasing sodium chloride concentrations, reaches a maximum, and then declines at high concentrations of sodium chloride; yet retaining the same solubility patterns in the presence of calcium chloride but decrease with increasing calcium chloride concentrations; and (4) require a sufficient detention time (may extend to hours) to induce precipitation as long as water is flowing even when their ions pairing conditions and concentrations may seem conducive to precipitation. Rather than eliminating calcium sulfate hydrates to obviate their profound limitations on any de-salting method, the nature of calcium sulfate hydrates is instead manipulated, to operate inefficient and costly de-salting methods.

For example, pressure-driven membranes (RO and NF) are commonly used to treat seawater and the like at ambient temperatures, and thus the calcium sulfate would be in the form of gypsum. In such membranes, the reduction-elevation level of ions between a product stream and a reject stream is governed by the membrane's rejection rate for each ion and the permissible recovery ratio (product flow rate/feed flow rate). However, the recovery ratio is controlled by the concentration polarization of rejected ions at the membrane surface as depicted in FIG. 1 [U.S. Pat. No. 7,093,663].

The concentration polarization causes membrane's pores plugging, membrane's fouling, and elevates osmotic pressure differences across the membrane. Critical operation parameters must be predicted to properly evaluate pressure-driven membranes including the: (1) actual rejection rate of ions ($R_a$) and concentrations of ions at the membrane ($C_m$); (2) saturation degrees of scale pairing ions at the membrane surface and in the reject stream; and (3) actual osmotic pressure differences across the membrane between ions concentrations at the membrane surface ($\Pi_m$), rather than that in the bulk feed stream ($\Pi_F$), and that in the product stream ($\Pi_P$) [Desalination, 2006, v. 201, pp. 106-113 and pp. 114-120; U.S. Pat. No. 7,093,663].

As shown in FIG. 2, the saturation limit of gypsum within certain confines increases with increasing sodium chloride concentrations. Even though RO membranes reject ions at nearly equal rates, which equally increase the background ionic strength (e.g., sodium chloride) that, in turn, increases the solubility limit of gypsum at the membrane surface and in the reject brine, the productivity of RO in de-salting seawater remains limited by two factors: (1) the actual osmotic pressure differences across the membrane between the concentrations of rejected ions at the membrane surface and in the product stream ($\Pi_m$-$\Pi_P$), thereby brine is reject at a level not exceeding 70,000 mg/L of TDS; and (2) gypsum builds-up at the membranes' surfaces and within membranes' pores wherein imperfect membranes' surfaces and pores act as nucleation sites for gypsum.

In addition to the restrictions on the TDS and gypsum levels, RO (as well as NF) membranes require extensive conventional pre-treatment to protect them (e.g., colloidal and suspended solids, carbonate scale, biological growth, etc.). Conventional coagulation-filtration methods within the seawater pre-treatment step may be replaced with membranes filtration such as microfiltration (MF), ultrafiltration (UF), or a combination. For example, FIG. 3 shows a possible general configuration of pressure-driven membranes to pre-treat and de-salt seawater. Screened and intermittently, not continuously, disinfected (e.g., by chlorine) seawater is mixed with an acid (e.g., sulfuric acid or hydrochloric acid) to lower the pH to about 4, an anti-scale agent, and an anti-foam agent before it is fed to a vacuum de-aerator or an atmospheric stripping tower to strip of carbon dioxide. The de-aerated seawater is then fed to a filtration step (e.g., MF, UF, or a combination) to remove suspended solids. Depending on the configuration of MF or UF, whether it's a dead-end or a cross-flow configuration, the reject stream from the filtration step may vary between 10-20% of seawater feed stream. Thus, the filtration step may be located upstream, rather than downstream, of the de-aeration step to reduce the size of the de-aerator or the stripping tower as well as the amounts of additives. The de-aerated and filtered seawater may then be de-chlorinated and de-oxygenated by adding an oxygen scavenger (e.g., sodium bisulfite) as well as alkalinized by a caustic solution (e.g., sodium hydroxide or lime) to at least neutralize the pH before it is de-salted by the RO. NF may also be integrated as an enabling step before the RO step to protect the RO membranes from gypsum scale and to presumably increase the recovery ratio of RO.

For seawater with 40,000 mg/L of TDS (e.g., Table 1: S1), RO may be setup in a conventional dual-stage as shown in FIG. 4 (Configuration A) wherein each RO stage is conducted at 25% recovery ratio (RR) and the reject stream from the first stage is used to feed the second stage. About 43% would be recovered from both stages as a total product stream, and about 57% would be rejected as a total reject stream with about 70,000 mg/L of TDS. The advantage of such a configuration is that the inherited hydraulic energy within the reject stream from the first stage (e.g., 2.8 bars less than the applied pressure at the seawater feed stream) is directly utilized to feed the second stage. On the other hand, one of the disadvantages of such a configuration is that the total product stream may not meet the permissible: (1) TDS range in drinking water (200-500 mg/L) since the product stream of RO membranes is generally entrained with dissolved ions (high but still incomplete ions rejection) whereas the second stage, in particular, is further strained by the higher TDS in the reject stream from the first stage (the feed stream for the second stage); and/or (2) stringent boron content in drinking water (0.5 mg/L) since RO membranes are incapable of efficiently removing boron species at an acidic pH level (boric acid form) or even a near neutral pH range (nearly equally boric acid and borate forms) unless a caustic solution is added to the RO feed stream at a pH level of about 10.5-11 (borate form), which is prohibitive (precipitate magnesium hydroxide). Partial alkalinization of RO feed stream (e.g., sodium hydroxide or lime) is also intricate since it may: (1) violate the permissible TDS range in the product stream (adding more ions) and/or elevate gypsum concentration, thereby promote gypsum saturation at the membranes' surfaces (e.g., lime); (2) not meet the permissible boron level in the product stream; and (3) require pH neutralization of both the total RO product stream and reject stream (e.g., by carbon dioxide).

On the other hand, NF membranes allow most of monovalent ions (chloride, sodium, and potassium) to pass through the membranes, partially reject divalent cations (magnesium and calcium), but nearly completely reject sulfate. The low NF rejection of monovalent ions (about 10%) reliefs the osmotic pressure restriction but operating NF within or below the saturation limit of gypsum at the membrane surface remains the limiting constrain. For seawater with 40,000 mg/L of TDS (e.g., Table 1: S1), FIG. 4 (Configuration A) also shows that NF can be setup in a conventional dual-stage wherein each stage is conducted at 50% recovery ratio (RR) and the reject stream from the first stage is used to feed to the second stage. The total product stream from both NF stages would be about 75% and nearly de-sulfated with about 18% less TDS than seawater feed stream. The total reject stream from both stages would be about 25% of the feed stream but heavily sulfate infested. As such, NF may be used as an enabling step for RO to relief RO from contending with the gypsum saturation issue but marginally mitigate the RO osmotic pressure constrain.

If NF is conducted in a dual-stage setup at 75% overall recovery ratio as an enabling step for RO as shown in FIG. 4 (Configuration B), the overall recovery ratio of RO in a dual-stage setup (reject stream from the first stage feeds the second stage) would be about 55%. This means that the total RO product stream is about 55% and the total RO reject stream is about 45% at the TDS limit of about 70,000 mg/L based on the RO feed stream (not the pre-treated seawater feed stream). However, the 12% gain in the RO's overall recovery ratio would come at a significant capital expenditure (the cost of adding the NF step is nearly as much as the cost of the RO step), an enormous pumping power since both NF and RO are high-pressure membranes, and the combined reject stream (59%) from both the NF and RO setups actually exceeds the total reject stream (57%) from the standalone RO setup (FIG. 4, Configuration A).

However, the inventor's suggestion is that an alternative and innovative RO setup may be envisioned as shown in FIG. 4 (Configuration C) to: (1) avoid the intricacy and expenses of adding and operating NF as an enabling step for RO; (2) resolve the permissible TDS and boron levels in the RO product stream for drinking water; (3) minimize and confine the use of a caustic solution only within the RO product; and (4) use low-pressure RO membranes in the second stage rather than high-pressure RO membranes in both stages. For seawater with 40,000 mg/L of TDS (e.g., Table 1: S1), RO can thus be setup in a dual-stage wherein the first stage is conducted at 43% recovery ratio (RR) and the product stream from the first stage is split into two slip streams (20% and 80%). The 80% slip stream of the product stream from the first stage is mixed with a caustic solution and fed to the second RO stage, which is a low-pressure stage (rather than a high-pressure stage as the case in the first RO stage) conducted at 90% recovery ratio. The product stream from the second stage is then blend with the 20% slip stream of the product stream from the first stage to generate the total RO product stream (about 40% overall recovery). The product stream can be neutralized with dosing carbon dioxide from, for example, the de-aerator. The reject stream from the second RO stage, which is 10% of the feed stream of the second stage (about 3% of the pre-treated seawater feed stream) is recycled for blending with the pre-treated seawater feed stream to: (1) compensate for the lost 10% as a reject stream from the second RO stage, and therefore to maintain the overall recovery ratio of the product stream at 40%; and (2) slightly reduce the TDS (mitigate the imposed osmotic pressure and gypsum saturation limits on RO) in the pre-treated seawater feed stream before it is fed to the first stage; and (3) partially alkalinize the pre-treated seawater feed stream before it is fed to the first stage to improve boron removal. The reject stream from the first stage remains at 57% with about 70,000 mg/L of TDS as the conventional RO design (FIG. 4, Configuration A), does not require pH neutralization, and its inherited hydraulic energy may be recycled via an energy recovery device (not shown in FIG. 4, Configuration C) to the pre-treated feed stream.

RO may be the most common de-salting method. However, MSF as a thermal-driven de-salting concept produces over 80% of all de-salted water in the world. The dominance of MSF is contributed to several factors. First, boiling occurs when the vapor pressure of water is equal to the total pressure on the water surface. FIG. 5 shows the boiling points of pure water and water containing sodium chloride (an approximation to a saline stream or a concentrated saline stream) at different concentrations as a function of total pressures. Under atmospheric pressure (1.01 bar), pure water boils at 100° C. whereas water saturated with sodium chloride boils at 109.5° C. On the other hand, pure water boils at 44° C. and water saturated with sodium chloride boils at 50.3° C. under a total pressure of 0.1 bar absolute (sub-atmospheric pressure). MSF (as well as multi-effect distillation, ME) are based on a series of flashing stages; each flashing stage possesses a lower pressure to lower the boiling point of seawater than the previous stage. This allows successive reduction of the boiling point of seawater as it gets more concentrated in going down the flashing stages. Such methods are thus based on a multiple boiling concept under reduced (sub-atmospheric) pressures without supplying additional heat after the first flashing stage. Pairing MSF with power in a power-water desalination co-generation plant to deliberately divert steam and/or direct exhausted steam from turbines via a brine heater as a heat source for MSF (or ME) dominates seawater de-salting.

Second, a product stream from any thermal-driven de-salting method in treating seawater and the like that contains non-volatile ions is nearly pure distillate. Entrainment of dissolved ions in the product stream (as is the case with RO) is far less pronounced, and therefore thermal-driven de-salting methods produce distillate below the permissible limits of TDS and boron in drinking water. However, distillate may require blending with brackish water, or lime and carbon dioxide, to adjust the TDS (makes it acceptable taste-wise to consumers) and prevent corrosion in distribution pipelines.

Third, MSF or any thermal-driven de-salting method, which is in contrast to pressure-driven methods, is not limited by the osmotic pressure of seawater and the like. Therefore, it is potentially capable of producing more distillate and rejecting brine at a level that may reach 250,000 mg/L of TDS. However, the prevailing hydrates of calcium sulfate above boiling point are hemihydrate and anhydrite (FIG. 2). Such hydrates are less soluble than the sparingly soluble gypsum and their solubilities are inversely and drastically decreased with increasing temperatures above the boiling point. De-salting seawater at, or above, the boiling point would be hindered since such hydrates are the dominant forms of calcium sulfate scale. Consequently, for seawater with 40,000 mg/L of TDS (e.g., Table 1: S1), brine from thermal-driven de-salting methods is rejected at a level not exceeding 65,000 mg/L of TDS as an upper limit.

Once-Through MSF (OT-MSF) is the simplest MSF desalination plant. An OT-MSF desalination train is depicted in FIG. 6 (Configuration A). It should be noted that an MSF desalination plant typically comprises multiple standalone OT-MSF trains. The only connections between OT-MSF trains in a desalination plant may be a seawater intake line to feed the plant and a line to reject brine back to a sea. Seawater feed stream (e.g., screened and chlorinated) is mixed with an acid (to convert bicarbonate to carbon dioxide) along with anti-scale and anti-foam, and passed through a vacuum de-aerator to remove carbon dioxide. The pre-treated seawater is then mixed with a caustic solution and an oxygen scavenger and introduced to the last stage of the train (e.g., each train typically comprises 23 heat recovery flashing stages). The brine heater is typically driven by turbines' exhausted steam (e.g., low pressure steam at 100° C.) to heat the pre-treated seawater in the first flashing stage to about 90° C. as at a top brine temperature where the pressure is slightly reduced so that it is just below the vapor saturation pressure of water. Such a relatively low top brine temperature allows de-salting seawater below the thresholds of the anhydrite scale envelope (FIG. 2). The sudden introduction of heated seawater into a lower pressure stage causes it to boil so rapidly as to flash into vapor. A relatively small portion of seawater feed stream in the first flashing stage is converted to vapor. The slightly concentrated seawater (brine) in the first stage then passes through the rest of the flashing stages where each stage is conducted at a reduced pressure to lower the boiling point of the brine than the previous stage. This allows successive reduction of the boiling point of the brine as it gets more concentrated in going down the flashing stages and without pumping aid. The flashed off vapor condenses on the tubes side of the condenser/pre-heater units and accumulates across the heat recovery as distillate. Because the de-aerated seawater feed stream entering the train counter flows with the flashed off brine, the released latent heat of the condensed vapor is used to preheat seawater as it enters the last stage of the train and gains more heat as it goes up the flashing stages before it enters the brine heater. The brine from the last flashing stage is rejected at about 40° C. and blown down to a sea.

In order to operate an OT-MSF desalination train below the anhydrite scale envelop, the distillate recovery ratio is forced to be very low (about 10%). At such a low recovery ratio, the TDS gain in reject brine is also low. However, the "Recycle Brine" (RB-MSF) desalination concept replaces the OT-MSF desalination concept in the past 20 years to: (1) presumably increase the distillate recovery ratio (e.g., claimed to be 30-40%); (2) presumably reduce the volume of seawater feed stream (thereby reducing the size of de-aerators) as well as the volume of reject brine; and (3) entirely eliminate the de-alkalinization step (adding an acid as a step in seawater pre-treatment) and the re-alkalinization step (adding a caustic solution as a step in distillate post-treatment).

FIG. 6 (Configuration B) shows a simplified flow diagram for an RB-MSF desalination train. The RB-MSF train comprises: (1) a brine heater; (2) a heat recovery section; and (3) a heat rejection section. The RB-MSF train differs from the OT-MSF train in several design features. First, the flashing stages are divided into to two sections, typically 20 stages for the heat recovery section and 3 stages for the heat rejection section, but the total conventional number of flashing stages may remain the same as in the OT-MSF train (e.g., conventionally 23 stages).

Second, the brine heater is driven by low- and intermediate-pressure steam to heat recycle brine in the brine heater to about 120° C. before its fed to the first flashing stage of the heat recovery section at a top brine temperature of about 110° C. where the pressure is slightly reduced so that it is just below the vapor saturation pressure of water. A small portion of the recycle brine is flashed off to form vapor in the first stage and the remaining and slightly more concentrated recycle brine (brine) passes through the rest of the flashing stages in the heat recovery section, wherein each stage is conducted at a reduced pressure to lower the boiling point of the brine than the previous stage, and form more vapor. The formed vapor condenses on the tubes side of the condenser/pre-heater units and accumulates across the heat recovery section as distillate, and it is released latent heat is used to preheat the recycle brine that counter flows to the heat recovery section.

Third, an RB-MSF desalination train is operated at a confined temperature range that may extend above the anhydrite scale envelope but below the scale envelope of hemihydrate (FIG. 2). At about 120° C., the time for phase transition between the more soluble metastable hemihydrate and the less soluble stable anhydrite may be much longer than the detention time in the flashing stages. As such, the operation principle of an RB-MSF desalination train relies on manipulating the nature of such calcium sulfate hydrates.

Fourth, brine from the last stage of the heat recovery section passes through additional flashing stages in the heat rejection section (pressure is also reduced at each successive stage) to recover more vapor and reduce the temperature of reject brine to about 33° C. The heat rejection section thus controls the excess heat within brine by dissipating it into a very large volume of cooling seawater stream. A portion of the pre-heated cooling seawater stream, in which bicarbonate may thermally breakdown into hydroxide ions and carbon dioxide, is used as a feed stream and thus is mixed with additives (e.g., anti-scale and anti-foam) and passed through a vacuum de-aerator to strip of carbon dioxide. The de-aerated feed stream is mixed with a portion of reject brine form the last stage of the heat rejection section to form recycle brine. Recycle brine is then mixed with an oxygen scavenger and introduced to the last stage of the heat recovery section. The remaining large portion of the pre-heated cooling seawater stream from the heat rejection section is rejected, and combined with reject brine from the final stage of the heat rejection before blown down to a sea.

An RB-MSF desalination train is presumed to increase the distillate recovery ratio to about 30-40%, but when the enormous volume of reject cooling seawater is considered, the ratio of distillate to total seawater feed stream (the actual feed for an RB-MSF train to produce distillate and the actual feed for only cooling seawater to be rejected) is about 10%, which is about the same distillate recovery ratio of an OT-MSF train. In addition, an RB-MSF train is more susceptible to hemihydrate and anhydrite scale than an OT-MSF train since it is operated at a top brine temperature of about 110° C. Furthermore, an RB-MSF train incurs additional enormous operating costs due to at least the required high pumping power to circulate and reject an enormous volume of cooling seawater and to constantly re-circulate an enormous volume of recycle brine. Yet, reject brine from an RB-MSF train is heavily infested with scale prone species than reject brine from an OT-MSF train, thereby is more harmful not only to marine environment but also to an RB-MSF desalination plant itself (e.g., alters the natural ions composition of seawater around intake lines). Thus, there is no difference between an OT-MSF desalination plant and an RB-MSF desalination plant in terms of actual distillate recovery ratio, but an OT-MSF desalination plant is less damaging to marine environment and more economic than an RB-MSF desalination plant, and yet both types of plants remain crippled by sulfate scale.

Produced Water and the Like

Formation water and oil are often concurrently produced as wet oil. In conventional oil production facilities, higher water cuts in wet oil occur during the middle or later stage of the primary recovery. Further increases in water cuts also occur during the secondary recovery (e.g., injection of large amounts of external saline water into hydrocarbons deposits) or the tertiary recovery (e.g., injection of steam into heavy oil and bitumen deposits) to sustain, improve, or enhance hydrocarbons recovery. For example, FIG. 7 illustrates a conventional wet oil gathering center wherein the bulk of formation water ("oil-in-water" (O/W) stream), which is referred to as produced water, is roughly separated from the bulk of oil ("water-in-oil" (W/O) stream) by a wet oil gravity tank.

As water cut rises in wet oil, so do the expenses and the problems associated with it. Artificial lift equipment, gathering flow lines, wet oil gathering centers, and produced water treatment and disposal systems may reach their operating capacity limits quickly. This forces frequent expensive modifications and/or expansions to flow lines and centers, or a reduction in wet oil production. Water is thus one of the most pressing issues in any wet oil production facility.

In contrast to seawater, which is a near uniform stream in term of ions content with some exceptions, produced waters are complex and variable streams (contain varying amounts of oil, gases, ions, and additives). The amounts of produced waters are also substantial, which in recent years render oil production as a by-product to production of produced waters. Despite the staggering amounts of produced waters, their treatment methods seem to remain conventionally evolving around partial removal of entrained oil with suspended solids in a standalone, or in direct conjunction with conventional de-salting methods (e.g., RO, NF, electrodialysis, vapor recompression, etc.), transcending the much need de-scaling step.

De-oiling is the first essential step in treating produced waters. Some oil may be dispersed in produced water whereas some of it may be dissolved in produced water. The proportions of dispersed oil and dissolved oil in produced waters vary considerably and depend on the nature and the recovery method of crude oil. The sum of dispersed oil and dissolved oil constitutes the Total Oil Content (TOC).

However, crude oil consists of a very large number of organics, most of which are hydrocarbons and derivatives of hydrocarbons (heteroatoms), and many of which are structurally undetermined or difficult to identify. Crude oil also contains hydrocarbon gases (e.g., methane, ethane, etc.) and acid gases (e.g., carbon dioxide and hydrogen sulfide). Further, crude oil varies in its own mix of organic species for reasons such as the nature, depth and maturity of its deposit and susceptibility to biodegradation. Classifying organics that may exhibit somewhat similar properties into a matrix of groups may be useful for tracking organics in crude oil. Crude oil may thus be divided into five structural groups: (1) normal and branched paraffins; (2) naphthenes (e.g., monocyclic paraffins, polycyclic paraffins, and their derivatives); (3) monocyclic aromatics; (4) polycyclic aromatics; and (5) heteroatoms (e.g., species containing nitrogen, sulfur, and oxygen). The content of heteroatoms is one of the distinguishing factors between the highly desirable light oil (low in heteroatoms) and the less desirable heavy oil or bitumen (high in heteroatoms).

Heteroatoms are common in heavy crude oil and bitumen, which render them appreciably acidic. Nitrogen-containing species are derived from biological sources such as porphyrins and amino acids. They are abundantly present in the form of organics with naphthenic and aromatic rings as basic species (e.g., pyridines and amides), neutral species (e.g., alkylhydroxypyridines), and acidic species (e.g., pyrroles). They also present, but to a lesser degree, in the forms organometallics with transition metals (e.g., vanadium, nickel, copper and iron) as non-basic porphyrin complexes. Sulfur-containing species may include mercaptans, sulfides, and thiophenes. Mercaptans and sulfides occur as cyclic, acyclic, and naphthenoaromatic species whereas thiophenes have aromatic and polyaromatic core structures. Oxygen-containing species mainly include carboxylic acids, phenols and ketones, and to a lesser extent include alcohols, ethers and esters.

In carboxylic acids, a carboxyl group also bears a hydroxyl group, and consequently their compounds are appreciably acidic. The carbon structures of carboxylic acids correspond with the carbon structures of hydrocarbons in crude oil that originates from, and thus they reflect the prevailing type of the hydrocarbons in the crude oil. As such, carboxylic acids are classified according to the substituent that is bonded to the carboxyl group: (1) aliphatic acids have an alkyl chain bound to the carboxyl group; and (2) aromatic acids have an aryl chain bound to the carboxyl group. A mixture of aliphatic carboxylic acids (aliphatic and condensed cycloaliphatic) and condensed aromatic carboxylic acids constitutes naphthenic acids ($C_nH_{2n-x}O_2$; where "n" is the carbon number and "x" is the hydrogen deficiency). Naphthenic acids are the most abundant of carboxylic acids, and they are predominant when crude oil is subjected to biodegradation. Biodegradation alters species' proportions of oxygen-containing organic species, and the increase in naphthenic acids results in a corresponding decrease in the relative proportions of other oxygen-containing organic species. Biodegradation of crude oil takes place under both aerobic and anaerobic conditions, and it is usually found predominately in immature heavy oil and bitumen deposits, oil deposits that subjected to water injection (especially sulfate-rich source water) to improve oil recovery, or heavy oil and bitumen deposits that subjected to steam injection or other thermal treatments.

The relative susceptibility of crude oil to biodegradation may proceed by preferentially destructively metabolizing normal paraffins, branched paraffins, monocyclic saturated and aromatic hydrocarbons, polycyclic naphthenic and aromatic hydrocarbons, and finally heteratoms. Biodegradation greatly enhances the generation of mixtures of oxygen-, oxygen/sulfur-, and oxygen/nitrogen-containing organic species by: (1) generating naphthenic acids via partial oxidation of pure hydrocarbons; (2) generating sulfoxides via the oxidation of sulfides and thiophenes and/or the sulfonation of phenolic and benzylic O-species; and (3) breaking the aromatic or cyclic ring of nitrogen-containing organic species (ring-opening) via intermediate pathways (generation of nitrogen/oxygen-containing organic species) by diluting, if not depleting, nitrogen, and adding carboxyl or hydroxyl groups. Thus, biodegradation negatively impacts the economy of oil production in terms of quality (e.g., degraded oil due to a decrease in the amount of paraffins), processibility (e.g., generation of surface active species, promotion of corrosion, impairment and resistant of catalytic hydro-treatment in refining crude oil, and emission of $NO_x$ and $SO_x$), and treatability of by-product waters (e.g., produced water, refinery's wastewater, and the like).

Carboxylic acids are amphiphilic species. As such, they have hydrophobic tail groups (e.g., long chain hydrocarbons, alkylnaphthalene, alkyl benzene, or polysiloxanes) and hydrophilic ionized or polar head groups (e.g. ionic soaps, alkyl benzene sulfonates, or amino acids). Their unique amphiphilic molecular structures control their adsorption, emulsification, shape, size and packing in water. When crude oil is mixed with water as in wet oil, the intermolecular bonds of their hydrophobic and hydrophilic groups are distorted; the hydrophobic tails are oriented toward the oil phase while the hydrophilic heads are oriented toward the water phase. Thus, they aggregate at the oil-water interface with their hydrophilic heads in contact with the water phase and their hydrophobic tails in the oil phase. They may assemble as interfacial films between the immiscible liquid phases (oil and water), and yet the increase of their concentrations causes them to self-associate as bi-layers, micelles and vesicles in the bulk (dominant) phase. Carboxylic acids with long aliphatic hydrophobic chains pack tightly at the interface, whereas branched and aromatic carboxylic acids pack loosely. In addition, increasing the length of the hydrophobic groups decreases their aqueous solubilities but increases their interface adsorption affinity and ability to form aggregates. On the other hand, their hydrophilic groups are surface active when the carbon number is greater than 7 (species with carbon number <7 may be more soluble in water, and thus may not be surface active), which causes severe scaling problems. Thus, the existence of carboxylic acids in wet oil is an overwhelming source for forming both emulsion and scale.

TOC is commonly used to evaluate the efficiency of de-oiling produced water as well as to monitor the toxicity and carcinogenicity of produced water especially when its discharged to surface water (e.g., contamination of seawater by offshore platforms); holding ponds and disposal wells (e.g., contamination of groundwater); or wastewater treatment facilities. FIG. 8 shows a simplification of TOC in produced water as the sum of dispersed and dissolved organics. In the U.S., EPA Method 1664 is the officially approved method for measuring TOC, which is defined as: "n-hexane extractable material (HEM: oil and grease) and n-hexane extractable material that is not adsorbed by silica gel (SGT-HEM: non-polar material) in surface and saline waters and industrial and domestic aqueous wastes". For offshore operations, the current regulation (EPA Method 1664) is a 30-day volume weighted average TOC in discharged produced water not exceeding 29 mg/L.

Inorganic scale prone species (constitute a portion of the ions content) in produced water, which may include divalent cations, monovalent and divalent anions, transition metals and silica, are also critical. Depending on the depth and formation type of oil deposits, produced waters may generally be a chloride-rich hyper-saline stream that is also rich in both sodium and calcium, or a sulfate-rich saline stream. Chloride-rich produced waters that are high in calcium are generally high in alkaline earth cations (strontium, barium, and in some cases radium) but depleted of sulfate. Some of the naturally occurring isotopes of strontium (Sr-87) and barium (Ba-130 and Ba-132) are radioactive. In addition, the availability of radium in produced water suggests that the decay series of radium's isotopes is common, and thus such water may be radioactive. However, sulfate-rich produced waters tend to contain an appreciable concentration of calcium, minor concentration of strontium, but may be depleted of barium and radium.

Oil producers may have the tendency to follow a so-called "application drift" where specifications from one method or project "drift" into another. The same goes for instrumentations where an instrument originally designed for one kind of measurement "drifts" into another. For example, an instrument designed to measure the particle size distribution (PSD) of suspended solids "drifted" to measure entrained oil droplets with suspended solids.

Consequently, partial de-oiling of produced waters is routinely targeted by two or three steps based on the size of entrained oil droplets. Skim tanks may be used as a first de-oiling step to primarily separate the bulk of oil droplets (e.g. >100 μm) from water. Corrugated plate separators, hydrocyclones, centrifuges, electrostatic, induced gas flotation without chemical addition, and combinations may be used in a second de-oiling step to remove smaller oil droplets (e.g., 15-100 μm). Sometimes, skim tanks (driven by a gravity force) may be replaced by hydrocyclones or centrifuges (driven by a centrifugal force) to minimize retention time. Induced gas flotation with chemical addition, adsorption (e.g., activated carbons, nutshells, manganese dioxide, etc.), membranes filtration (e.g., MF or UF), extraction (e.g., liquid solvents, polymers, or supercritical fluids), and combinations may be used, but not always, as a final polishing step to remove finer oil droplets. As shown in FIG. 7, for example, produced water (O/W stream), may be treated by: (1) three conventional de-oiling steps (e.g., skim tanks, gas flotation, and along with adsorption, filtration, or extraction; and then (2) direct de-salting (if applied) without de-scaling.

However, none of the above mentioned de-oiling steps, individually or collectively, may be capable of efficiently removing TOC, and thus a significant portion of TOC may remain in the treated produced water as emulsion-scale and/or toxicity contributors. In addition, such de-oiling steps are not ZLD since they produce oily waste stream (e.g., skim tanks, hydrocyclones, centrifuges, MF, and UF), oily stripping streams (e.g., extraction by polymers), and exhausted oily adsorption materials (e.g., activated carbon, nutshell, and manganese dioxide) that require a proper disposal path and/or a further treatment. Produced water treatment thus remains a dual problem since neither the oil phase is sufficiently recovered (de-watered) in a useful form nor is the water phase sufficiently de-oiled, and yet there are still the questions of the: (1) disposal of oily waste streams, oily stripping streams, exhausted adsorption materials, or a combination; (2) environmental impact of discharging produced water; and (3) beneficial use of produced water. As a result, offshore produced water discharge limits may be frequently violated; onshore surface discharge of produced water remains restricted; and the beneficial usage of produced water by de-salting methods remains hindered since neither efficient nor economic de-salting methods can be operated in the absence of efficient de-oiling (as well as de-scaling).

Despite these issues, it is interesting to observe that the so-called "application drifts" that may directly combine conventional inefficient de-oiling methods with conventional de-salting methods (e.g., RO, NF, electrodialysis, vapor recompression, or a combination that were originally developed for de-salting nearly uniform streams such as seawater) are continually proposed to treat produced water. This would seem to be unusual since the technical inferiorities of such systems are recognizable. Beside the need for efficient de-oiling of the water phase and de-watering of the oil phase as explained above, Table 1 (S6 or S7) and FIG. 2 show, for example, that such scale-infested produced waters are already saturated with gypsum at ambient temperatures. In terms of ions content, such produced waters differ from seawater in two distinct factors. First, calcium in seawater is about 40% of sulfate whereas calcium in such produced waters substantially exceeds sulfate (about 200% of sulfate). Second, the possible breakdown of salt compounds in seawater does not contain calcium chloride, which is in contrast to the possible breakdown of salt compounds in produced waters since the excess of calcium in such produced waters may exist as calcium chloride. FIG. 9 shows that the presence of calcium chloride depresses the solubility of gypsum while retaining the same solubility patterns as in the presence of sodium chloride despite the solvation power of sodium chloride due to the common ion effect (calcium). Thus, directly de-salting such produced waters would be heavily impaired if not virtually impossible since any of the calcium sulfate hydrates may be dominant.

The pitfalls of such "application drifts" are reflected, for example, in combining conventional de-oiling with de-salting methods to treat produced water (e.g., Table 1: S6 and S7). In such application drifts, produced water may be inefficiently treated by a myriad of typical de-oiling units (e.g., a skim tank, a flotation unit, and a nutshell unit) and in conjunction with (as depicted in FIG. 3) membrane filtration units (MF or UF), as well as membrane de-salting units (RO, NF, or a combination). From strictly de-oiling and de-scaling standpoints, such a primitive application "drift" does not offer the capability demanded nor does match the nature and chemistry of produced waters. The combined de-oiling units and membrane filtration units, despite of their excessiveness, do not remove dissolved oil, which would be carried over to the de-salting units as foulants. Of equal importance, the de-salting units may nearly immediately impair due to excessive scale build-up as a result of the already gypsum saturated produced waters and the presence of calcium chloride that depresses the solubility limit of gypsum, which would be further compounded by the effect of concentration polarization (FIG. 1) at membranes' surfaces.

FIG. 10 may depict another example of an application "drift" wherein the critical de-oiling and de-scaling problems are not obviated. Produced water is roughly de-oiled by a skim tank and a flotation unit before it is mixed with additives (e.g., acid, anti-scale and anti-foam) and fed to a feed heat exchanger where it is pre-heated to near boiling by the hot distillate from an evaporator. The pre-heated produced water (brine) is de-aerated by a steam stripper, and mixed with caustic soda and fed to the evaporator where it is temperature is further raised by low-pressure steam. The evaporator may be a mechanical vapor recompression (MVR) system, which basically consists of a bulky vapor body, a large falling-film heat exchanger and a large mechanical vapor compressor. The brine is continually circulated through the evaporator via the top of the falling-film heat exchanger. Vapor is generated as the brine falls down the tubes of the falling-film heat exchanger, withdrawn into the compressor, and compressed to above the brine's normal boiling point. The compressed vapor is fed to the falling-film heat exchanger to transfer its latent heat to the circulated brine. Here, MVR is designed as a conventional single stage evaporator operated above the brine's normal boiling point and may be in conjunction with the use of sodium sulfate or calcium sulfate as a seeding agent to presumably preferentially precipitate anhydrite along with other scale prone species in the supersaturated brine away from tubes of the falling-film heat exchanger.

From strictly de-oiling and de-scaling points of view; let alone other engineering, metallurgical, economical (capital and operating costs) and environmental issues that may be prohibitive; the design is inadequate for two profound reasons. First, the de-oiling steps are deficient since they generate a roughly de-oiled stream that carries over dissolved oil to the feed heat exchanger, steam stripper and MVR system. The carried over dissolved oil acts as a foulant for heat transfer surfaces and causes severe foaming problems (e.g., a compressor failure and/or a liquid discharge from vapor heads). Second, produced water is already saturated with calcium sulfate before processing. As evaporation progresses in the feed heat exchanger and the steam stripper prior to the evaporator, calcium sulfate scale along with other notorious scale prone species are concentrated, which would cause scale fouling/plugging, reduce heat transfer efficiency, and elevate the boiling point thereby reducing the temperature driving force for heat transfer. The latter is a critical factor in designing an MVR with low temperature driving force above normal boiling. Aside from the feed heat exchanger and steam stripper that are directly subjected to calcium sulfate scaling, the seeding concept within the evaporator to minimize tubes plugging is also ineffective. Hemihydrate is the first form of calcium sulfate hydrates to precipitate in the evaporator according to the rule of "stepwise sequence" of phase transformations (from less stable to more stable forms) and it is precipitation evolves rapidly and for a relatively finite time (e.g., extends to several hours) compared to the detention time elapsing during the circulation of brine through the evaporator. Thus, the metastable hemihydrate would continuously deposit on the heat transfer tubes even though calcium sulfate is readily supersaturated in the slurry but the anhydrite stable form may not be attained quickly enough to minimize tubes plugging.

It should also be recognized that the seeding agent must be selected of the same form that deposits during evaporation but even if a selected form of calcium sulfate was used as a seeding agent, different forms of calcium sulfate (hemihydrate and anhydrite) would co-exist and vary with the conditions in the evaporator. If sodium sulfate was used as a seeding agent, on the other hand, the forms of sodium sulfate would have a temperature-solubility phase diagram [e.g., U.S. Pat. Nos. 8,197,696 and 7,501,065] that totally differs from the temperature-solubility phase diagram of calcium sulfate forms. In addition, the seeding agent must be dispersed in the evaporator in the form of very fine particles, and the amount of the seeding agent must substantially exceed the concentration of calcium sulfate in produced water. Thus, the seeding mechanism is very difficult to control since the: (1) seeding agent may be a mismatch (in terms of type, form, particle size, and combinations of these factors) even though it is in the form of sulfate; and (2) amount of the seeding agent is considerable. As a consequence, the seeding mechanism: (1) requires a high flow rate to evaporate produced water in the heat transfer tubes, which may diminish the evaporation efficiency; and (2) is not adoptable in multi-stage flash evaporators wherein the boiling point of brine is successively reduced by reducing pressure (FIG. 5).

It should be pointed it out that produced water in this invention is referred to any water produced from the exploration and production of hydrocarbons (gas, liquid, and combinations) including unconventional sources such as hydro-fracturing and coal-bed methane. Hydro-fracturing is used to fracture and stimulate hydrocarbons deposits by injecting a fracturing fluid that may be potable water mixed with a large number of additives. During and after fracturing, organics including hydrocarbons and additives along with ions and water within formation layers are mobilized and brought to the surface as produced water (also refers to as flow-back water). In coal-beds methane, produced water is generated by removing water that permeates coal-beds thereby reducing the hydrostatic pressure to free methane from the crystal surfaces of coal-beds. In contrast to the conventional production of hydrocarbons, produced waters from hydro-fracturing and coal-beds methane flow in large amounts in the exploration stage (during fracturing or removing water) and in the early stage of production, and then the flow drops or may cease as the production of hydrocarbons increases.

THE OBJECTIVES OF THE INVENTION

The first objective of this invention is to provide innovative de-scaling methods that not only effectively and directly de-scale source water but also recover useful inorganics. As a result of the effective de-scaling methods, the second objective of this invention is to provide a new effective design for a de-salting method, which is based on what I coined a Brine-Forward Multi-Stage Flash (BF-MSF) desalination concept. The BF-MSF desalination concept: (1) entirely eliminates recycle brine and reject cooling water, which, in turn, provides tremendous savings in pumping power; and (2) maximizes distillate production, minimizes the volume of reject brine and produces scale-depleted reject brine. As also a result of the effective de-scaling methods, the third objective of this invention is to provide an effective design for flue gas scrubbing that not only facilitates absorbing sulfur dioxide ($SO_2$) from flue gas and liberating carbon dioxide ($CO_2$) but also facilitates heating the de-scaled source water for the BF-MSF desalination concept. As such, the vertical integration of source water desalination can be attained by this invention.

SUMMARY OF THE INVENTION

In one aspect, the present invention provides a method for treating source water. The inventive method comprises de-carbonating source water by: (i) mixing source water with either an aluminum source or an iron source to convert at least a portion of the naturally present bicarbonate in source water to carbon dioxide; and (ii) de-aerating source water to remove carbon dioxide and produce de-carbonated source water. The aluminum source is selected from the group consisting of aluminum chloride, aluminum chlorohydrate, aluminum nitrate, aluminum sulfate, aluminum acetate, aluminum formate, and combinations thereof. The iron source is selected from the group consisting of iron chloride, iron chlorohydrate, iron nitrate, iron sulfate, iron acetate, iron formate, and combinations thereof. The method comprises de-carbonating source water, wherein step (ii) further comprises de-sulfating the de-carbonated source water by: (i) mixing the de-carbonated source water with an organic solvent to form precipitates comprising either magnesium sulfoaluminate or magnesium sulfoferrate in a precipitator unit; (ii) recovering at least a portion of the organic solvent by a gas; and (iii) filtering the precipitates to produce de-scaled source water. The organic solvent is selected from the group consisting of isopropylamine, propylamine, dipropylamine, diisopropylamine, ethylamine, diethylamine, methylamine, dimethylamine, ammonia, and combinations thereof. The gas is selected from the group consisting of nitrogen, air, water vapor, and combinations thereof. The method comprises de-sulfating the de-carbonated source water, wherein step (i) further comprises mixing the de-carbonated source water with a magnesium source. The magnesium source is selected from the group consisting of dolime, magnesium oxide, magnesium hydroxide, and combinations thereof. Source water is selected from the group consisting of seawater, cooling water, a reject stream from a de-salting method, a spent stream from flue gas de-sulfurization, source water comprises sulfate, and combinations thereof. The method comprises de-sulfating the de-carbonated source water, wherein step (iii) further comprises contacting at least a slip stream of the de-scaled source water with flue gas in a scrubber, wherein the scrubber comprises a heat exchanger, to scrub flue gas with the slip stream of the de-scaled source water and to condense flue gas by passing the de-scaled source water through the heat exchanger of the scrubber, thereby absorbing sulfur dioxide from flue gas, liberating carbon dioxide, generating a spent slip stream, and heating the de-scaled source water to produce heated de-scaled source water. The spent slip stream from the scrubber further comprises filtering to produce a filtered slip stream. The spent slip stream from the scrubber further comprises the steps of re-circulating the spent slip stream through the scrubber, bleeding at least a portion of the spent slip stream, and adding at least a portion of the slip stream of the de-scaled source water to substitute the bled portion of the spent slip stream. The method comprises de-sulfating the de-carbonated source water, wherein step (iii) further comprises feeding the de-scaled source water to a first train of a Brine-Forward Multi-Stage Flash (BF-MSF) desalination system, wherein the BF-MSF desalination system comprises a plurality of trains arrange in series, in which each train comprises a brine heater and a heat recovery section, except a last train wherein the last train comprises a brine heater, a heat recovery section and a heat rejection section, each train is operated at a preselected concentration factor, each train produces distillate and brine, brine from each train except the last train passes through to feed the next succeeding train, thereby each train progressively possesses a higher level of total dissolved solids (TDS) than a previous train, and brine from the last train is rejected at a level not exceeding 250,000 mg/L of said TDS, thereby the BF-MSF desalination system is a multi-boiling system without supplying additional heat after the brine heater of each train, and a multi-concentration system without supplying additional de-scaled source water after the first train. The method comprises heating the de-scaled source water, wherein the heated de-scaled source water further comprises feeding the heated de-scaled source water to a first train of a Brine-Forward Multi-Stage Flash (BF-MSF) desalination system, wherein the BF-MSF desalination system comprises a plurality of trains arrange in series, in which each train comprises a brine heater and a heat recovery section, except a last train wherein the last train comprises a brine heater, a heat recovery section and a heat rejection section, each train is operated at a preselected concentration factor, each train produces distillate and brine, brine from each train except the last train passes through to feed the next succeeding train, thereby each train progressively possesses a higher level of total dissolved solids (TDS) than a previous train, and brine from the last train is rejected at a level not exceeding 250,000 mg/L of said TDS, thereby the BF-MSF desalination system is a multi-boiling system without supplying additional heat after the brine heater of each train, and a multi-concentration system without supplying additional heated de-scaled source water after the first train. The method comprises de-carbonating source water, wherein the source water further comprises passing at least a portion of the source water before de-carbonating the source water through heat transfer tubings of a heat rejection section in a last train of a BF-MSF desalination system to condense at least a portion of flashing brine in the heat rejection section of the last train.

In another aspect, the present invention provides a method for treating source water. The inventive method comprises de-carbonating source water by: (i) mixing source water with an organic solvent in an anionated form to convert at least a portion of the naturally present bicarbonate in source water to carbon dioxide; and (ii) de-aerating source water to remove carbon dioxide and produce de-carbonated source water. The organic solvent is selected from the group consisting of isopropylamine, propylamine, dipropylamine, diisopropylamine, ethylamine, diethylamine, methylamine, dimethylamine, ammonia, and combinations thereof. The anionated form is selected from the group consisting of chloride, chlorohydrate, nitrate, sulfate, phosphate, acetate, formate, and combinations thereof. The method comprises de-carbonating source water, wherein step (ii) further comprises de-sulfating the de-carbonated source water by: (i) mixing the de-carbonated source water with either aluminum hydroxide or iron hydroxide to regenerate the organic solvent and to form precipitates comprising either magnesium sulfoaluminate or magnesium sulfoferrate in a precipitator unit; (ii) recovering at least a portion of the organic solvent by a gas; and (iii) filtering the precipitates to produce de-scaled source water. The gas is selected from the group consisting of nitrogen, air, water vapor, and combinations thereof. The method comprises de-sulfating the de-carbonated source water, wherein step (i) further comprises mixing the de-carbonated source water with a magnesium source. The magnesium source is selected from the group consisting of dolime, magnesium oxide, magnesium hydroxide, and combinations thereof. The method comprises recovering the organic solvent further comprises mixing the recovered organic solvent with an acid to produce the organic solvent in the anionated form. The acid is selected from the group consisting of hydrochloric acid, chloral hydrate, nitric acid, sulfuric acid, phosphoric acid, citric acid, acetic acid, formic acid, and combinations thereof. Source water is selected from the group consisting of seawater, cooling water, a reject stream from a de-salting method, a spent stream from flue gas de-sulfurization, source water comprises sulfate, and combinations thereof. The method comprises de-sulfating the de-carbonated source water, wherein step (iii) further comprises contacting at least a slip stream of the de-scaled source water with flue gas in a scrubber, wherein the scrubber comprises a heat exchanger, to scrub flue gas with the slip stream of the de-scaled source water and to condense flue gas by passing the de-scaled source water through the heat exchanger of the scrubber, thereby absorbing sulfur dioxide from flue gas, liberating carbon dioxide, generating a spent slip stream, and heating the de-scaled source water to produce heated de-scaled source water. The spent slip stream from the scrubber further comprises filtering to produce a filtered slip stream. The spent slip stream from the scrubber further comprises the steps of re-circulating the spent slip stream through the scrubber, bleeding at least a portion of the spent slip stream, and adding at least a portion of the slip stream of the de-scaled source water to substitute the bled portion of the spent slip stream. The method comprises de-sulfating the de-carbonated source water, wherein step (iii) further comprises feeding the de-scaled source water to a first train of a Brine-Forward Multi-Stage Flash (BF-MSF) desalination system, wherein the BF-MSF desalination system comprises a plurality of trains arrange in series, in which each train comprises a brine heater and a heat recovery section, except a last train wherein the last train comprises a brine heater, a heat recovery section and a heat rejection section, each train is operated at a preselected concentration factor, each train produces distillate and brine, brine from each train except the last train passes through to feed the next succeeding train, thereby each train progressively possesses a higher level of total dissolved solids (TDS) than a previous train, and brine from the last train is rejected at a level not exceeding 250,000 mg/L of said TDS, thereby the BF-MSF desalination system is a multi-boiling system without supplying additional heat after the brine heater of each train, and a multi-concentration system without supplying additional de-scaled source water after the first train. The method comprises heating the de-scaled source water, wherein the heated de-scaled source water further comprises feeding the heated de-scaled source water to a first train of a Brine-Forward Multi-Stage Flash (BF-MSF) desalination system, wherein the BF-MSF desalination system comprises a plurality of trains arrange in series, in which each train comprises a brine heater and a heat recovery section, except a last train wherein the last train comprises a brine heater, a heat recovery section and a heat rejection section, each train is operated at a preselected concentration factor, each train produces distillate and brine, brine from each train except the last train passes through to feed the next succeeding train, thereby each train progressively possesses a higher level of total dissolved solids (TDS) than a previous train, and brine from the last train is rejected at a level not exceeding 250,000 mg/L of said TDS, thereby the BF-MSF desalination system is a multi-boiling system without supplying additional heat after the brine heater of each train, and a multi-concentration system without supplying additional heated de-scaled source water after the first train. The method comprises de-carbonating source water, wherein the source water further comprises passing at least a portion of the source water before de-carbonating the source water through heat transfer tubings of a heat rejection section in a last train of a BF-MSF desalination system to condense at least a portion of flashing brine in the heat rejection section of the last train.

In yet another aspect, the present invention provides a method for treating source water. The inventive method comprises de-sulfating source water by: (i) mixing source water with an organic solvent, and either aluminum hydroxide or iron hydroxide to form precipitates comprising either magnesium sulfoaluminate or magnesium sulfoferrate in a precipitator unit; (ii) recovering at least a portion of the organic solvent by a gas; and (iii) filtering the precipitates to produce de-scaled source water. The organic solvent is selected from the group consisting of isopropylamine, propylamine, dipropylamine, diisopropylamine, ethylamine, diethylamine, methylamine, dimethylamine, ammonia, and combinations thereof. The gas is selected from the group consisting of nitrogen, air, water vapor, and combinations thereof. The method comprises de-sulfating source water, wherein step (i) further comprises mixing source water with a magnesium source. The magnesium source is selected from the group consisting of dolime, magnesium oxide, magnesium hydroxide, and combinations thereof. Source water is selected from the group consisting of seawater, cooling water, a reject stream from a de-salting method, a spent stream from flue gas de-sulfurization, source water comprises sulfate, and combinations thereof. The method comprises de-sulfating source water, wherein step (iii) further comprises contacting at least a slip stream of the de-scaled source water with flue gas in a scrubber, wherein the scrubber comprises a heat exchanger, to scrub flue gas with the slip stream of the de-scaled source water and to condense flue gas by passing the de-scaled source water through the heat exchanger of the scrubber, thereby absorbing sulfur dioxide from flue gas, liberating carbon dioxide, generating a spent slip stream, and heating the de-scaled source water to produce heated de-scaled source water. The spent slip stream from the scrubber further comprises filtering to produce a filtered slip stream. The spent slip stream from the scrubber further comprises the steps of re-circulating the spent slip stream through the scrubber, bleeding at least a portion of the spent slip stream, and adding at least a portion of the slip stream of the de-scaled source water to substitute the bled portion of the spent slip stream. The method comprises de-sulfating source water, wherein step (iii) further comprises feeding the de-scaled source water to a first train of a Brine-Forward Multi-Stage Flash (BF-MSF) desalination system, wherein the BF-MSF desalination system comprises a plurality of trains arrange in series, in which each train comprises a brine heater and a heat recovery section, except a last train wherein the last train comprises a brine heater, a heat recovery section and a heat rejection section, each train is operated at a preselected concentration factor, each train produces distillate and brine, brine from each train except the last train passes through to feed the next succeeding train, thereby each train progressively possesses a higher level of total dissolved solids (TDS) than a previous train, and brine from the last train is rejected at a level not exceeding 250,000 mg/L of said TDS, thereby the BF-MSF desalination system is a multi-boiling system without supplying additional heat after the brine heater of each train, and a multi-concentration system without supplying additional heated de-scaled source water after the first train. The method comprises heating the de-scaled source water, wherein the heated de-scaled source water further comprises feeding the heated de-scaled source water to a first train of a Brine-Forward Multi-Stage Flash (BF-MSF) desalination system, wherein the BF-MSF desalination system comprises a plurality of trains arrange in series, in which each train comprises a brine heater and a heat recovery section, except a last train wherein the last train comprises a brine heater, a heat recovery section and a heat rejection section, each train is operated at a preselected concentration factor, each train produces distillate and brine, brine from each train except the last train passes through to feed the next succeeding train, thereby each train progressively possesses a higher level of total dissolved solids (TDS) than a previous train, and brine from the last train is rejected at a level not exceeding 250,000 mg/L of said TDS, thereby the BF-MSF desalination system is a multi-boiling system without supplying additional heat after the brine heater of each train, and a multi-concentration system without supplying additional heated de-scaled source water after the first train. The method comprises de-sulfating source water, wherein the source water further comprises passing at least a portion of the source water before de-sulfating the source water through heat transfer tubings of a heat rejection section in a last train of a BF-MSF desalination system to condense at least a portion of flashing brine in the heat rejection section of the last train.

This invention is of particular interest in connection with applications such as, but not limited to: source water de-scaling; source water desalination; flue gas desulfurization; hydrocarbons production and recovery (oil, gas, and combinations); wastewater treatment; advanced wastewater treatment; mining; geothermal power generation; chlor-alkali; hydrocarbons-fired power plants; industrial boilers; steam generation; cooling towers; agricultural drainage water; mine drainage water; textile wastewater; landfill leachate; mineral slurry transport water; paper mills spent water; aluminum anodizing spent water; spent water from fertilizer production; spent water from textile production; spent water from all kinds of metals manufacturing; spent water from batteries manufacturing; and salts production from natural brine, solar ponds, and salts bitterns.

This invention is not restricted to use in connection with one particular application. This invention can be used, in general, for the effective and selective removal of critical inorganic and organic species from source water, effective de-salting of source water and effective scrubbing of flue gas. Further objects, novel features, and advantages of the present invention will be apparent to those skilled in the art upon examining the accompanying drawings and upon reading the following description of the preferred embodiments, or may be learned by practice of the invention.

DESCRIPTION OF THE PREFERRED EMBODIMENT

The Precipitation Concept

Figure 1:
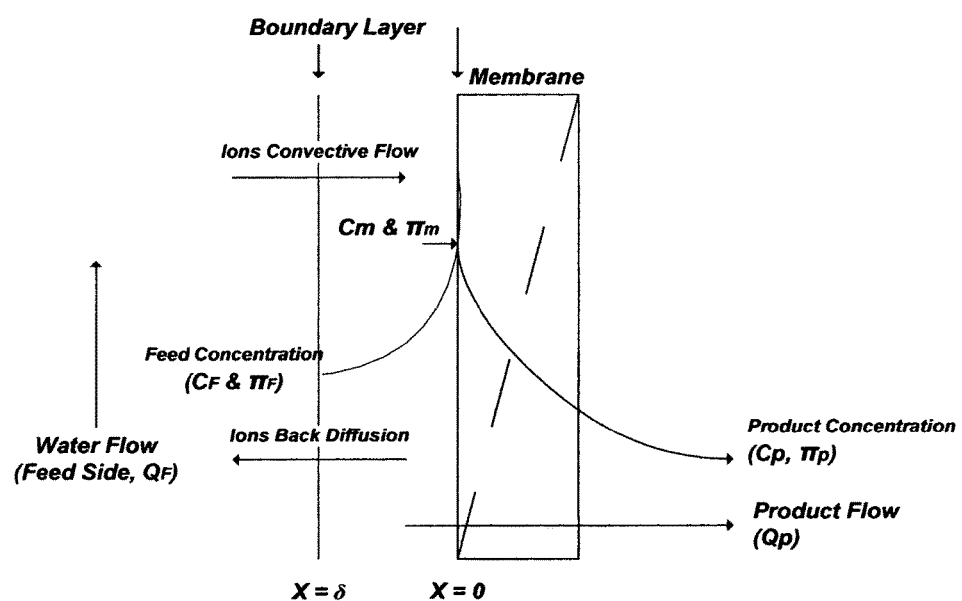
FIG. 1 illustrates the concentration polarization profile in pressure-driven membranes.

I have previously invented the Liquid-Phase Precipitation (LPP) process for the separation of ionic species from aqueous streams. LPP is based on mixing an aqueous stream with a suitable solvent at ambient temperature and atmospheric pressure to form selective precipitates. The suitable solvents are those which have the capability to meet two basic criteria.

The first criteria is the suitability to precipitate targeted ionic species (charged inorganics and organics) from aqueous solutions. The selected organic solvent must be miscible with the aqueous phase. Of equal importance, the targeted ionic species must be sparingly soluble in the organic solvent. The addition of such a solvent to an ionic-aqueous solution leads to the capture of part of the water molecules and reduces the solubility of ionic species in the water which form insoluble precipitates. The solubility of the targeted ionic species in the organic solvent is a critical factor in achieving the degree of saturation. Therefore, solubility related factors such as ionic charge, ionic radius, and the presence of a suitable anion in the aqueous solution play an important role in affecting and characterizing precipitates formation.

The second criteria is suitability for overall process design. For ease of recovery, the selected solvent must have favorable physical properties such as low boiling point, high vapor pressure, high relative volatility, and no azeotrope formation with water. From a process design standpoint, the selected solvent must have low toxicity since traces of the organic solvent always remain in the discharge stream. Further, the selected solvent must be chemically stable, compatible, and relatively inexpensive.

Several organic solvents have been identified for potential use in the LPP process. These solvents are isopropylamine (IPA), ethylamine (EA), propylamine (PA), dipropylamine (DPA), diisopropylamine (DIPA), diethylamine (DEA), and dimethylamine (DMA). However, IPA is the preferred solvent in the LPP process. The preference of IPA is attributed to its high precipitation ability with different ionic species, favorable properties (boiling point: 32.4° C.; vapor pressure: 478 mmHg at 20° C.); and low environmental risks.

Nitrogen ($N_2$) can form compounds with only three covalent bonds to other atoms. An ammonia molecule contains $sp^3$-hybridized nitrogen atom bonded to three hydrogen atoms. An amine molecule contains $sp^3$-hybridized nitrogen atom bonded to one or more carbon atoms. The nitrogen has one orbital filled with a pair of unshared valence electrons, which allows these solvents to act as bases. Thus, the organic solvents (ammonia and amines) are weak bases that could undergo reversible reactions with water or acids. However, when such solvents react with an acid, the unshared electrons of the solvent are used to form sigma bond with the acid, which would transform the solvent into an anionated form. The reaction of isopropylamine with formic acid, for example, produces isopropylamine formate, wherein isopropylamine is the organic solvent and formate is the anionated form. Such solvents in anionated forms act as weak acids. The anionated forms of such solvents that are found useful in this invention comprise chloride, chlorohydrate, nitrate, sulfate, phosphate, acetate, formate, and combinations thereof. Such solvents can be regenerated from their anionated forms by a hydroxide source.

Improving the performance of LPP is always a target. One of the essential improvements is to minimize, if not eliminate, the use of the organic solvent. Inorganic additives can alternatively replace organic solvents or can be used in addition to organic solvents to induce precipitation of targeted species. The suitable inorganic additives for LPP are those that can form an insoluble inorganic-based compound of targeted charged species in an aqueous stream. Such inorganic additives should preferably be recoverable and recyclable, useable as a useful by-product, or produced locally from reject or waste streams. Also, such inorganic additives should not, themselves, constitute pollutants. Several inorganic additives were indentified, developed, and tested for LPP.

A second targeted improvement for LPP is to produce controllable precipitates that are uniformly distributed with high yield and preferably in submicron sizes. Submicron precipitates are fundamentally stable and form spontaneously if a narrow resistance time distribution is improvised and/or a surface active agent (naturally existing or induced) sufficiently acts as a dispersant to prevent immediate agglomeration of the newly formed precipitates. Submicron precipitates are thus dispersed phase with extreme fluxionality. On the other hand, non-spontaneous unstable macrosize precipitates will form if given sufficient time to rest.

The state (stabile, metastabe, or unstable) of given precipitates can be expressed thermodynamically by the Gibbs free energy relation as follows:

$$\Delta G = \Delta H - T\Delta S \qquad (1)$$

where ΔG is the free energy of precipitates (provided by, for instance, mechanical agitation or other means), ΔH is the enthalpy that represents the binding energy of the dispersed phase precipitates in water, T is the temperature, and ΔS is the entropy of the dispersed phase precipitates (the state of precipitates disorder). The binding energy (ΔH) can be expressed in terms of the surface tension (τ) and the increase in the surface area (ΔA) as follows:

$$\Delta G = \tau \Delta A - T\Delta S \qquad (2)$$

When the introduced free energy into the aqueous stream exceeds the binding energy of precipitates, individual precipitates are broken down and redistributed. In addition, when a surface active agent is present in the aqueous stream as an effective dispersant, τ is reduced and thus the precipitates binding energy is diminished. Furthermore, part of the introduced energy may not contribute to precipitates' deflocculating but it dissipates in the aqueous stream in the form of heat which reduces viscosity. All of these factors increase precipitates dispersion or disorder (positive entropy). As such, the change in the entropy (ΔS) quantitatively defines precipitates dispersion (solvation).

The Compressed-Phase Precipitation (CPP) process was thus developed by the inventor to achieve sub-micron precipitates in certain applications. CPP is conceptually similar to LPP in which the targeted ionic species must be nearly insoluble in the organic solvent whereas the mother solvent (water) is miscible with the organic solvent. However, the difference is that fluids in the CPP process can be subjected to pressure and/or temperature manipulations, or fluids modifications to force unusual thermo-physical properties (e.g., exhibit liquid-like density but with higher diffusivity, higher compressibility and lower viscosity).

The fast diffusion combined with low viscosity of a compressed organic solvent into an aqueous phase produces faster supersaturation of targeted ionic species, and their possible precipitation in the desired and sub-micron and micron sizes. Thus, the precipitate's size, size distribution, morphology, and structure can be controlled. Achieving faster supersaturation would, in turn, minimize the use of the organic solvent, reduce the size of precipitation vessels (a very short retention time), and allow the recovery of targeted ionic species in the desired precipitates shape and distribution.

Several factors could influence the performance of the precipitation process. Among such factors are: (1) the chemistry of the aqueous stream along with the identity and concentration of it is targeted species; and (2) the conditions under which precipitation is induced by mixing with additives (an inorganic additive, an organic solvent, and combinations) with the aqueous stream.

Dolime

Dolime (MgO—CaO), which is calcined dolomite, may nearly contain equal amounts of magnesia and lime as well as minor amounts of other oxides. The hydration of lime in dolime occurs readily at atmospheric pressure whereas the hydration of magnesia requires an extended reaction time and/or high pressure and temperature to completely hydrate. In order to convert dolime to magnesium and calcium tetrahydroxide (Mg(OH)$_2$— Ca(OH)$_2$), the hydration reaction of dolime may be carried out in a pressurized vessel at a temperature of about 150° C. to convert oxides to their respective hydroxides. However, the separation of magnesium hydroxide from calcium hydroxide in the hydrated dolime is extremely difficult due to their close affinity to water. On the other hand, if dolime was hydrated with a suitable saline stream (e.g., a stream that is rich with magnesium chloride but strictly free or nearly free of sulfate), the recovery of magnesium hydroxide would be nearly doubled since magnesium hydroxide is recovered from both the hydrated dolime and the stream that contains magnesium chloride, thereby magnesium in the stream is replaced with calcium from dolime.

Magnesium-rich chloride-type natural brine is the preferred saline stream since it contains an appreciable concentration of magnesium chloride (as well as calcium chloride) and it is free or nearly free of sulfate. The overall hydration reaction of dolime with magnesium-rich chloride-type natural brine may be simplified as follows:

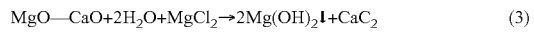

$$\text{MgO—CaO} + 2\text{H}_2\text{O} + \text{MgCl}_2 \rightarrow 2\text{Mg(OH)}_2\downarrow + \text{CaC}_2 \qquad (3)$$

The produced magnesium hydroxide and calcium chloride (Eq. 3) exist together in two distinct phases. Magnesium hydroxide is formed as precipitates and recovered as a direct product and/or subsequently transformed to other by-products, while the calcium chloride is dissolved in the spent brine since it is extremely soluble in water (solubility limits: 7,750-9,200 meq./L at 20-30° C.). The spent brine may be rejected in disposal wells. Since the typically employed brine also contains a very high concentration of calcium chloride (e.g., higher than the concentration of magnesium chloride) along with the generated calcium chloride from the conversion of lime in dolime, calcium chloride may also be recovered from the spent brine (after precipitating and recovering magnesium hydroxide) by: (1) a standalone evaporation process to concentrate calcium chloride to about 13,890 meq./L at 175° C.; or (2) a freezing process to concentrate calcium chloride to about 5,230 meq./L at −55° C.

On the other hand, the concentration of magnesium in, for example, seawater is typically much smaller than that in magnesium-rich chloride-type natural brines. In addition, roughly about one-third of magnesium in normal or relatively normal seawater is in the form of sulfate and the remaining two-third is in the form of chloride (e.g., Table 1: S1). The hydration reaction of dolime with seawater may be given for both magnesium chloride and magnesium sulfate as follows:

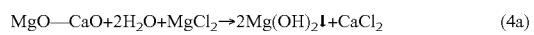

$$\text{MgO—CaO} + 2\text{H}_2\text{O} + \text{MgCl}_2 \rightarrow 2\text{Mg(OH)}_2\downarrow + \text{CaCl}_2 \qquad (4a)$$

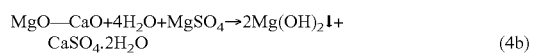

$$\text{MgO—CaO} + 4\text{H}_2\text{O} + \text{MgSO}_4 \rightarrow 2\text{Mg(OH)}_2\downarrow + \text{CaSO}_4 \cdot 2\text{H}_2\text{O} \qquad (4b)$$

or may be simplified as follows:

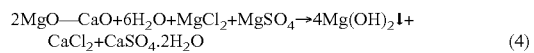

$$2\text{MgO—CaO} + 6\text{H}_2\text{O} + \text{MgCl}_2 + \text{MgSO}_4 \rightarrow 4\text{Mg(OH)}_2\downarrow + \text{CaCl}_2 + \text{CaSO}_4 \cdot 2\text{H}_2\text{O} \qquad (4)$$

Figure 11:
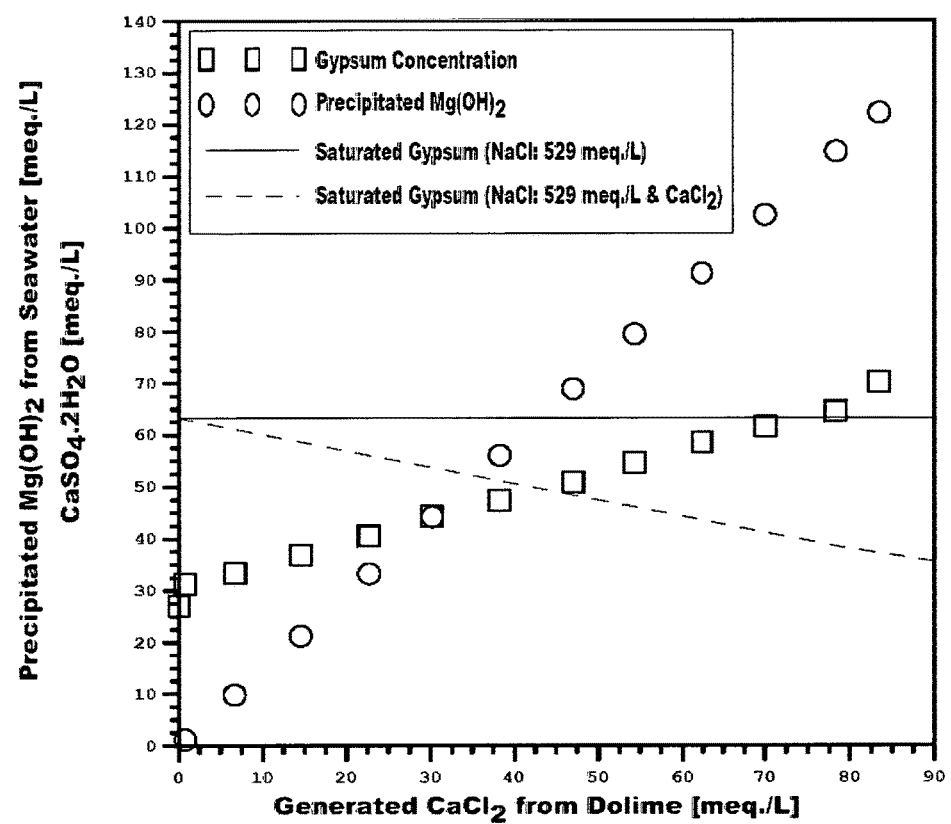
FIG. 11 illustrates the precipitation of magnesium hydroxide and the generation of gypsum from treating seawater with dolime.

I have tested the hydration reaction of dolime with de-carbonated seawater (e.g., Table 1: S1) to precipitate magnesium hydroxide. As stated above, the possible breakdown of salt compounds in seawater does not contain calcium chloride. However, calcium chloride would be generated if dolime was used to precipitate magnesium hydroxide, which would, in turn, depress the solubility limit of gypsum. As shown in FIG. 11, about 50% of magnesium hydroxide is precipitated from seawater (a nearly equivalent amount of magnesium hydroxide would also be extracted from the hydrated dolime itself) at about the saturation limit of gypsum; that is at 529 meq./L of sodium chloride background in the presence of the generated calcium chloride. At the 50% precipitation rate of magnesium hydroxide, the co-precipitation of gypsum, which would render the value of the precipitated magnesium hydroxide useless, is avoided. However, about 73% of magnesium hydroxide is precipitated from seawater at about the saturation limit of gypsum;

that is at 529 meq./L of sodium chloride background but when the effect of the generated calcium chloride on the saturation limit of gypsum is ignored. At 73% precipitation rate of magnesium hydroxide, the spent seawater still contains the same concentration of sulfate (65 meq./L) as in seawater feed stream but much richer with calcium, and therefore the spent seawater is essentially saturated with gypsum. As such, the precipitation of magnesium hydroxide may be conducted at a confined precipitation range (50-73%) that extends above the saturation envelope of gypsum in the presence of calcium chloride but below the saturation envelope of gypsum when the effect of calcium chloride is ignored. Within such a precipitation range of magnesium hydroxide from seawater, the possible contamination with gypsum precipitates may be avoidable (e.g., at 50% precipitation rate of magnesium hydroxide) or at least tolerable (e.g., at <73% precipitation rate of magnesium hydroxide).

Gypsum co-precipitation with magnesium hydroxide is highly undesirable since: (1) their separation from each other is difficult and expensive; and (2) their combination as a final product has no market value other than a wasteful sludge that may be disposed of in landfills. As such, precipitating higher amounts of magnesium hydroxide in a near pure form from seawater without being heavily contaminated with gypsum precipitates when the conditions are more conducive to gypsum precipitation is simply not practicable. When a supersaturated mixture of magnesium hydroxide and gypsum is detained in conventional settling and thickening vessels to produce a settled slurry and spent seawater, water is no longer flowing within the settling slurry and is also depleted of sodium chloride (depresses further the solubility of gypsum). Gypsum (as well as the other hydrates of calcium sulfate) may require an extended detention time to induce precipitation when the concentration of calcium and sulfate is at saturation and the saline stream is in motion (not in a stagnant condition). A bulk of gypsum precipitates would thus contaminate magnesium hydroxide precipitates in the settling slurry. In addition, when the settled slurry is conventionally de-hydrated by evaporation above 95° C., gypsum will transform to the less soluble hemihydrate and anhydrite forms at elevated temperatures. Such hydrates would heavily precipitate, cause severe scaling problems in pipes and processing equipment, and even destroy magnesium hydroxide precipitates (the targeted product).

Figure 12:
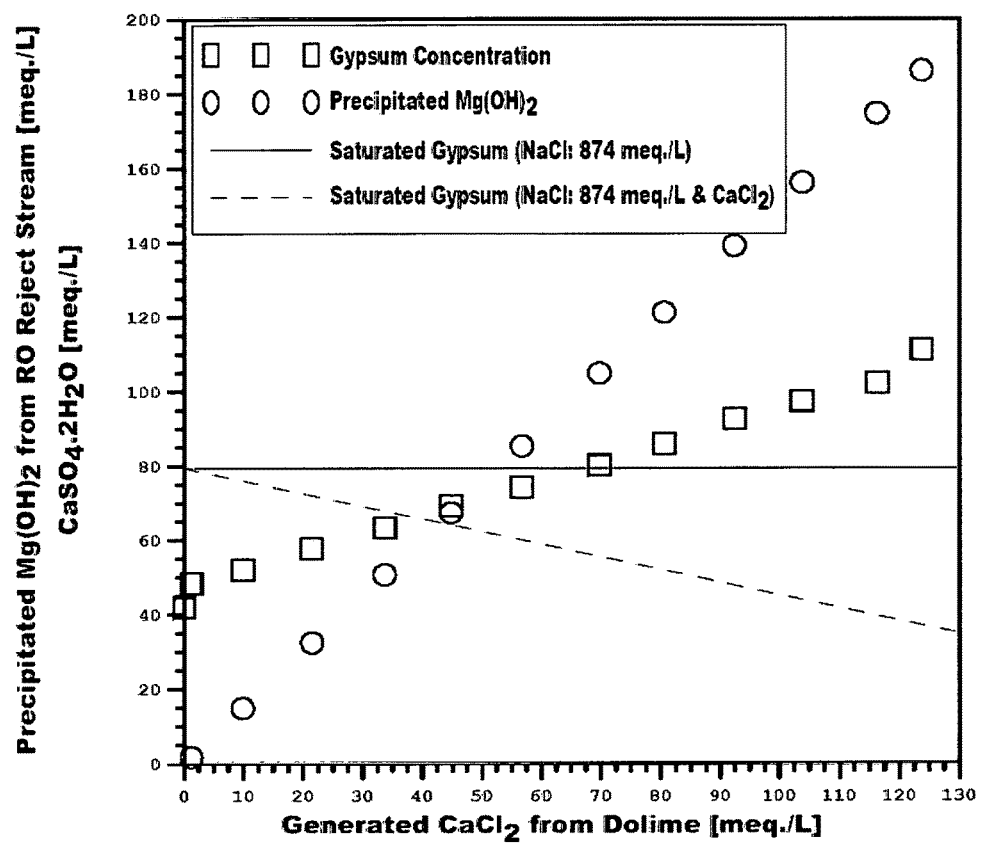
FIG. 12 illustrates the precipitation of magnesium hydroxide and the generation of gypsum from treating an RO reject stream with dolime.
Figure 13:
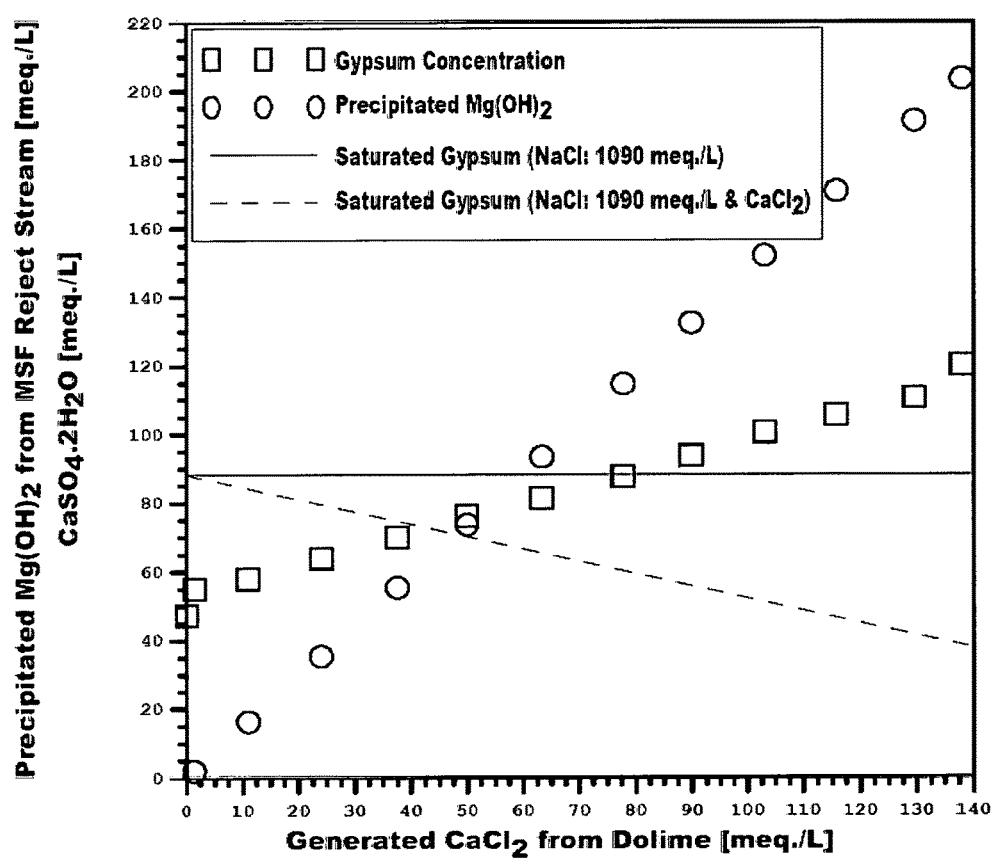
FIG. 13 illustrates the precipitation of magnesium hydroxide and the generation of gypsum from treating an RB-MSF reject stream with dolime.

I have also tested the precipitation of magnesium hydroxide using dolime from de-carbonated reject streams of seawater de-salting methods including RO, RB-MSF, and NF. FIGS. 12 and 13 reveal, respectively, the precipitation rates of magnesium hydroxide from the RO reject stream and RB-MSF reject stream. RO and RB-MSF nearly equally concentrate ions in their reject streams (the concentration factor for RO is 1.64 and for RB-MSF is 1.77). Consequently, the proportions of magnesium chloride and magnesium sulfate in RO and RB-MSF reject streams remain preserved as nearly as their proportions in seawater (e.g., Table 1: S1, S2 and S3). However, such reject streams are much richer with sulfate than seawater. As a result, the precipitation of magnesium hydroxide from RO and RB-MSF reject streams may be conducted at a confined precipitation range (27-42%) that extends above the saturation envelope of gypsum in the presence of the generated calcium chloride but below the saturation envelope of gypsum when the effect of the generated calcium chloride is ignored. Within this confined precipitation range of magnesium hydroxide from the RO or RB-MSF reject stream, the possible contamination with gypsum precipitates may be avoidable or at least tolerable.

Figure 4:
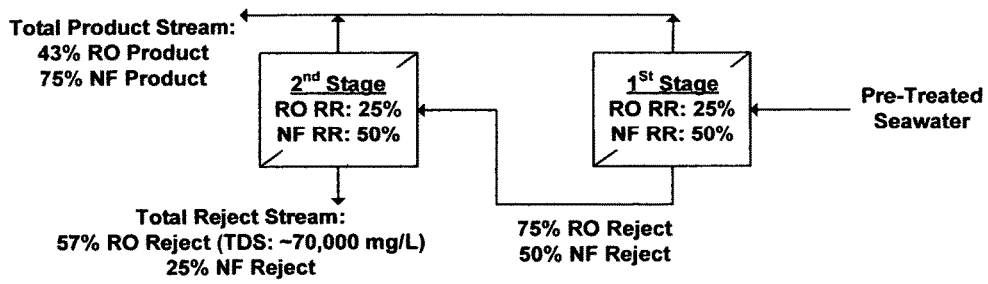
FIG. 4 illustrates simplified configurations for de-salting seawater by pressure-driven membranes.
Figure 4:
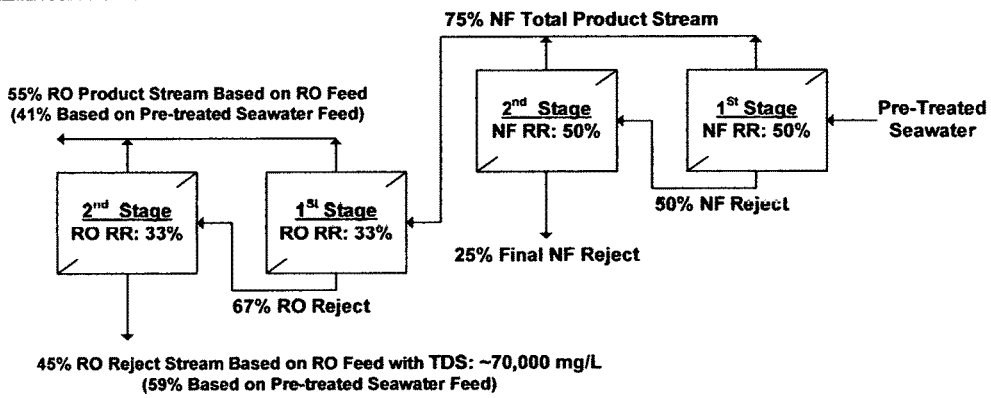
Figure 4:
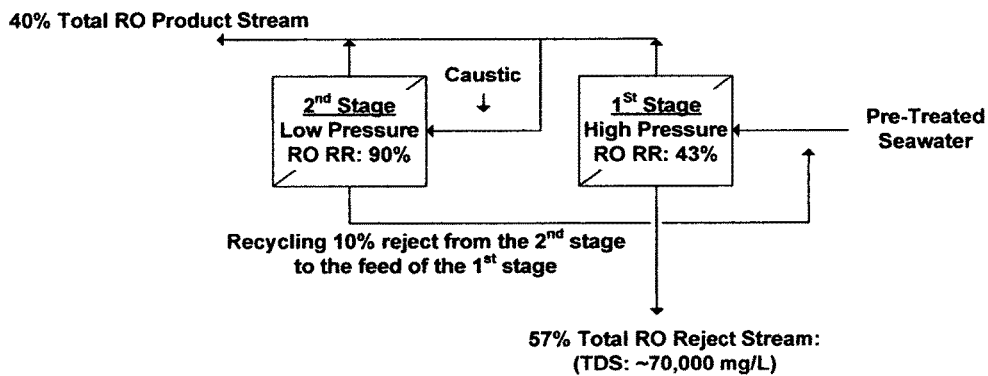
Figure 5:
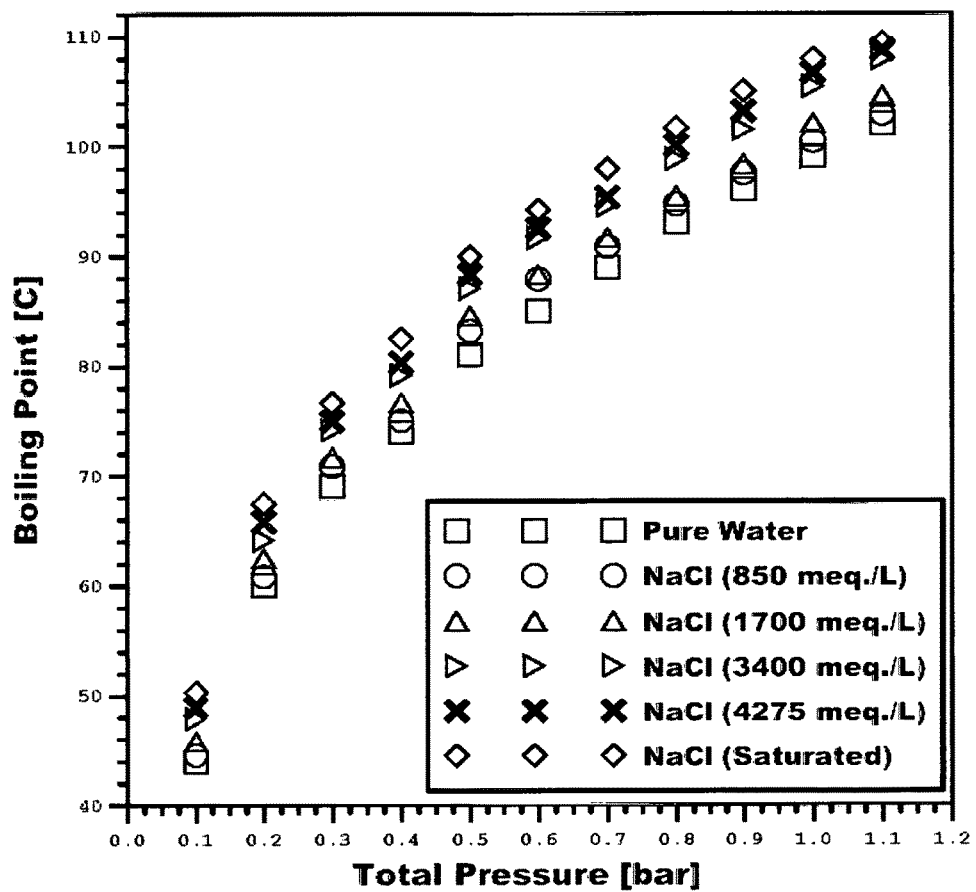
FIG. 5 illustrates the boiling points of pure water and water containing sodium chloride versus total pressures.
Figure 14:
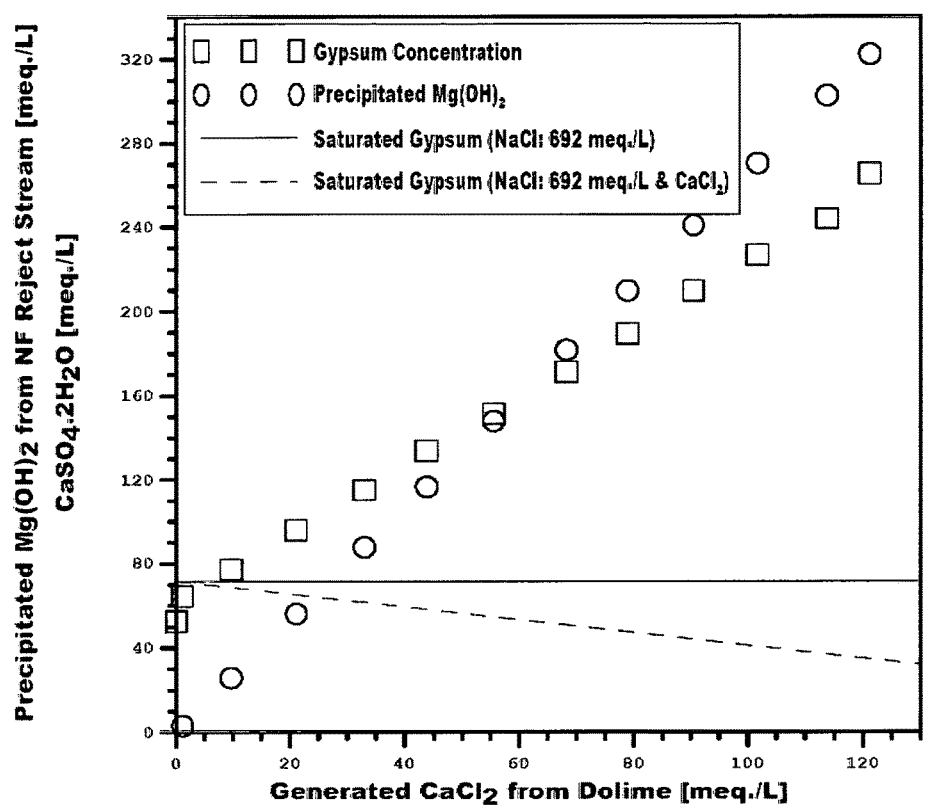
FIG. 14 illustrates the precipitation of magnesium hydroxide and the generation of gypsum from treating an NF reject stream with dolime.

The NF reject stream was generated in my experiments by conventionally conducting NF in a dual-stage setup at it is 75% maximum possible recovery ratio to treat seawater (FIG. 4, Configuration A). Roughly about two-third of magnesium in the NF reject stream is in the form of sulfate and the remaining one-third is in the form of chloride (Table 1: S4). This is opposite to the proportions of magnesium chloride and magnesium sulfate in seawater (Table 1: S1), which is attributed to the low rejection of chloride (about 10%), partial rejection of magnesium (about 55%), and near complete rejection of sulfate (about 97%) by NF. The concentration of sulfate in the NF reject stream is about 4-times higher than the concentration of sulfate in seawater. This results, as shown in FIG. 14, in a low precipitation rate of magnesium hydroxide (about 20%) in a near pure form from the NF reject stream (as well as a nearly equivalent amount of magnesium hydroxide would be extracted from the hydrated dolime) at about the saturation limit of gypsum, which is at 692 meq./L of sodium chloride background and in the presence of the generated calcium chloride, to avoid gypsum co-precipitation. The spent NF reject stream at such a low precipitation rate of magnesium hydroxide still contains the same substantial concentration of sulfate (252 meq./L) as the NF reject stream but richer with calcium, and consequently the spent NF reject stream is saturated with gypsum. However, if magnesium hydroxide and gypsum are allowed to progressively co-precipitate to near complete precipitation of magnesium hydroxide from the NF reject stream as may be useless products, the sulfate concentrations in the spent NF reject stream are still considerable and may range between 72 and 35 meq./L, which reflect the difference in the saturation limit of gypsum at 692 meq./L of sodium chloride when the presence of calcium chloride at 120 meq./L is considered (35 meq./L of sulfate) or ignored (72 meq./L of sulfate). In addition, the concentration of the generated calcium chloride that remains dissolved in the spent NF reject stream is also insignificant to be considered for co-precipitation (with magnesium hydroxide and gypsum as may be useless products) by a costly thermal-driven process (e.g., evaporation or freezing).

This inventor [e.g., U.S. Pat. No. 8,197,696] teaches the innovative utilization of an amine solvent to effectively and selectively precipitate magnesium hydroxide from a saline stream, whether the saline stream is only a chloride-rich type or rich with both chloride and sulfate. On the other hand, the useful utility of dolime in selectively recovering magnesium hydroxide as a valuable product from chloride-type natural brines that are rich with magnesium chloride but free or nearly free of sulfate has been well known and extensively explored in the prior art over the past century [e.g., U.S. Pat. Nos. 3,301,633 and 3,366,451]. However, such a useful utility is diminished when dolime is applied to a super sulfate-rich saline stream such as an NF reject stream since, as explained above, a very low selective recovery of magnesium hydroxide is feasible (about 20%), unless magnesium hydroxide is allowed to progressively co-precipitate with gypsum and calcium chloride in a thermally-driven unit [as claimed in U.S. Pat. No. 9,045,351], which would practically produce inseparable sludge that has no value and may be disposed of as waste. As also explained above, it is worth re-iterating that the co-precipitation of gypsum with magnesium hydroxide by dolime does not equate, by no means, to the removal of sulfate from sulfate-rich source water.

For applying dolime to a sulfate-rich stream (e.g., seawater) or a super sulfate-rich saline stream (e.g., reject streams from RO, MSF, NF and the like), a partial selective recovery of magnesium hydroxide in a confined precipitation range (50-73% for normal or near normal seawater; 26-42% for RO or RB-MSF reject stream; and <20% for NF reject stream) must be sought so that the generated gypsum from the double displacement reaction between lime in dolime and magnesium sulfate in the saline stream would be at least within a confined concentration that may extend above the saturation envelope of gypsum in the presence of calcium chloride but below the saturation envelope of gypsum when the effect of calcium chloride is ignored. If gypsum was allowed to precipitate with magnesium hydroxide, neither a useful product would be recovered nor would sulfate be sufficiently removed from the saline stream. Attempts to solve such critical issues have been uniquely unsuccessful. Thus, any new process, economically competitive, but capable of efficiently removing sulfate and devoid of generating any useless waste products would be of great interest. This invention recognizes such a viable interest, and thus methods have now been developed wherein such issues and disadvantages can be obviated by efficiently binding the precipitation of magnesium and sulfate in a useful inorganic compound, without the formation of gypsum and/or the forced co-precipitation of calcium chloride, thereby not only recovering valuable inorganic by-products but also effectively de-scaling source water.

The De-Oiling/De-Watering Concept

An oil-water stream (e.g., wet oil), depending on it is water cut and viscosity, may be a "water-in-oil" (W/O) stream (may also refer to as a W/O emulsion) or an "oil-in-water" (O/W) stream (may also refer to as an O/W emulsion). The water cut in an oil-water stream is the ratio of the water volume to the volume of total produced liquids (water and oil). A W/O stream means oil is the "primary" (e.g., continuous) phase while water is the "secondary" (e.g., dispersed) phase. On the other hand, an O/W stream means water is the "primary" (e.g., continuous) phase while oil is the "secondary" (e.g., dispersed) phase. Conventional oil-water separation methods are inefficient, whether the stream is a W/O or an O/W, since they basically break down a given "primary" phase into two "secondary" phases, one is richer and the other one is poorer in the "secondary" phase of the "primary" phase. Consequently, water is neither recovered as a readily de-oiled stream (e.g., does not meet regulations) nor is oil recovered as a readily de-watered stream (e.g., does not meet specifications).

Figure 7:
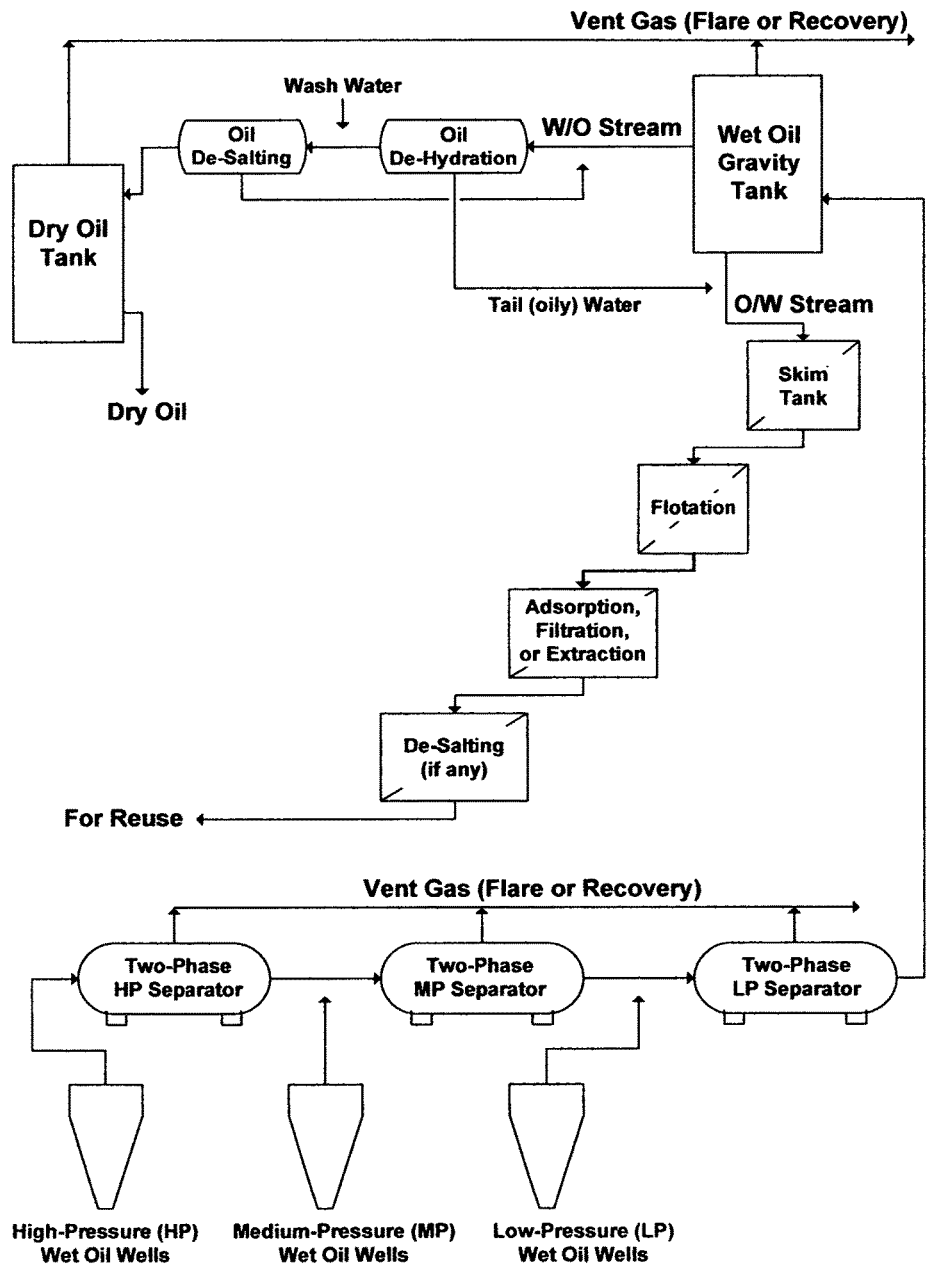
FIG. 7 illustrates a conventional wet oil gathering center.
Figure 8:
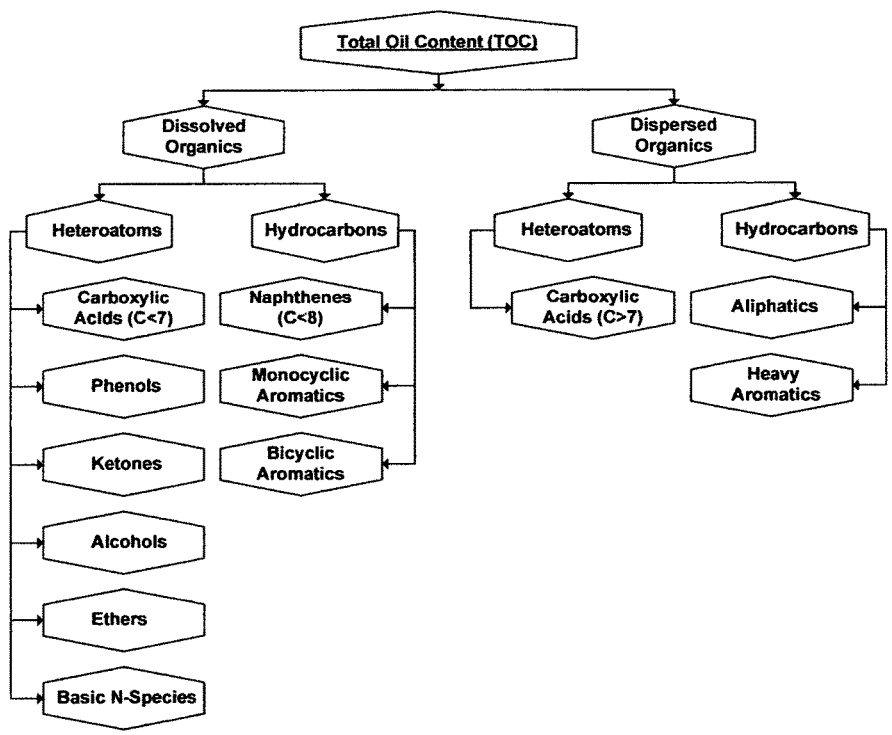
FIG. 8 illustrates the Total Oil Content (TOC) in produced water.
Figure 9:
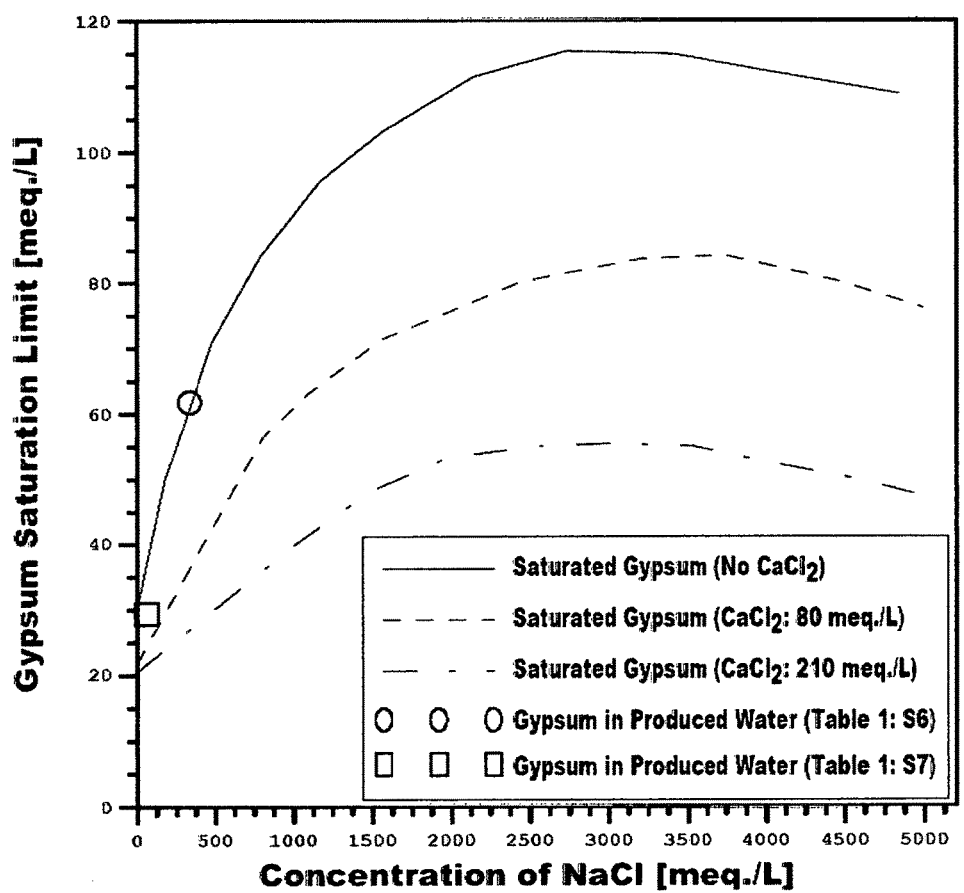
FIG. 9 illustrates the saturation limits of gypsum as a function of the concentrations of sodium chloride and calcium chloride.
Figure 10:
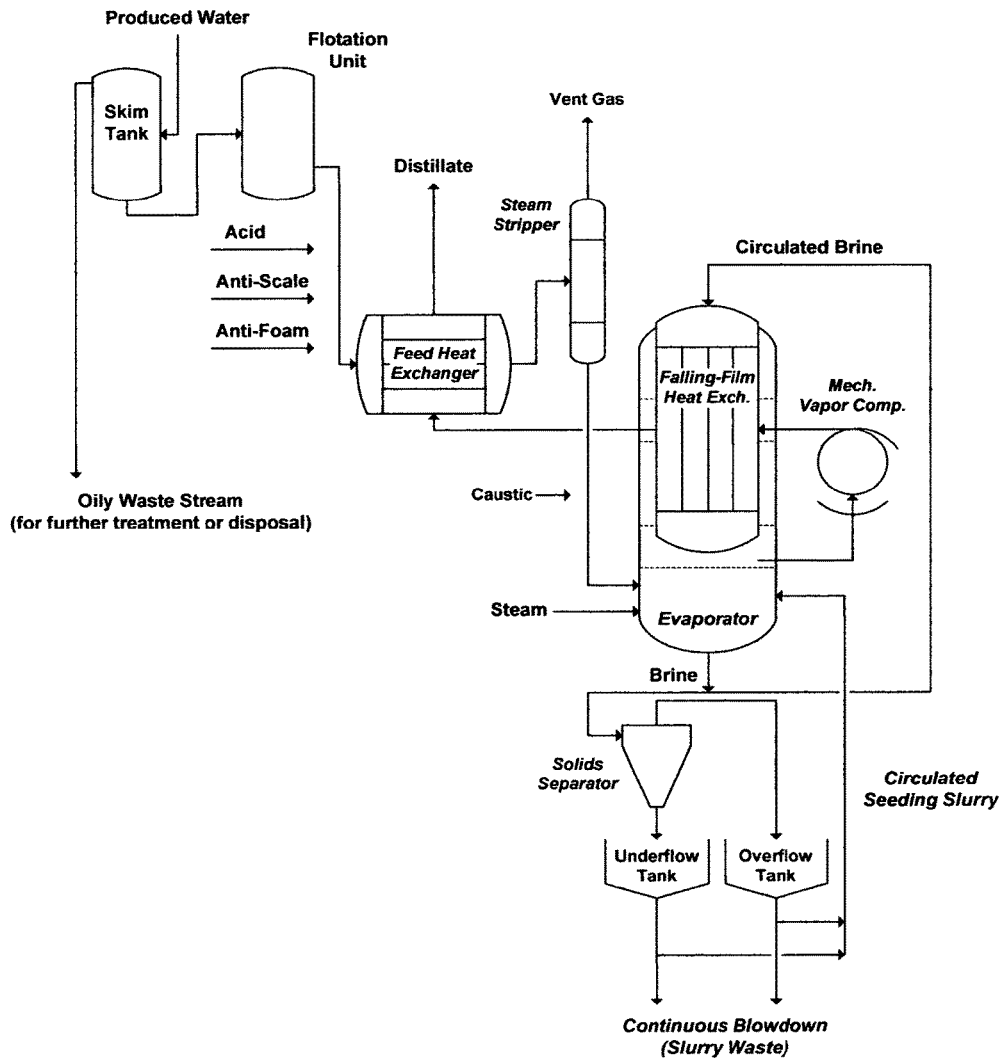
FIG. 10 illustrates a flow diagram for de-oiling and de-salting produced water.

As can be seen in FIG. 7, which depicts a conventional wet oil gathering center, for example, wherein wet oil may be a W/O stream or an O/W stream (depending on the water cut and viscosity), is broken down in a wet oil gravity tank to further produce two distinct streams; a W/O stream and an O/W stream. The W/O stream from the wet oil gravity tank still requires further de-hydrating (de-watering) and washing/de-salting (the oil de-salter may be a single or a dual stage). The source of salt in a W/O stream from a wet oil gravity tank (e.g., FIG. 7) is the carried over water within the oil phase, not the oil itself, since salt is dissolved within the water content. Thus, the specifications for dry oil are 0.2 v % of water content and 10 pounds of salt per thousand barrels of oil (PTB). Such specifications are based on an assumed 15,000 mg/L of salt content dissolved within 0.2 v % of the water content in oil. However, the salinity of water in wet oil varies widely that may range between 5,000 and 250,000 mg/L. When the water salinity in wet oil is high, the water content in oil must be reduced accordingly to meet the specification of salt content in oil (10 PTB). It should be noted that such specifications for the water content and salt content in oil may also refer to as Basic Sediment and Water (BS&W). On the other hand, a O/W from a wet oil gravity tank (e.g., FIG. 7) also demands de-oiling by extensive and multiple steps. It is worth noting that in some wet oil gathering centers, two-phase (gas-liquids) separators and gravity tanks may be replaced with three-phase (gas-liquid-liquid) separators.

However, water de-oiling and oil de-watering are synonymous. Therefore, they should be simultaneously targeted by an efficient method, rather than by an elaborate wet oil gathering center with multiple and costly inefficient steps that often meet neither produced water regulations nor dry oil specifications.

By convention, the term "de-watering" refers to the separation of the water content from oil, thereby separating the dissolved salt content within the water content from oil. The term "de-oiling" refers to the separation of the oil content (including all organics) from water; organics that may be found in: (1) crude oil, shale oil, coal oil, bitumen, tar, heating oil, bunker oil, kerosene, diesel fuel, aviation fuel, gasoline, naphtha, synthetic oil, lubricating oil, used or spent motors oil, waxes, and lubricating greases; (2) refineries and industrial aqueous wastes such as, for example, sour waters; aromatics resulting from the cracking of hydrocarbon gases; phenols, amines (e.g., anilines) and their toxic ligands; benzene polycarboxylic acids (e.g., benzoic, phthalic, isophthalic, terephthalic, hemimellitic, trimelitic, trimesic, mellophanic, prehnitic, pyromellitic, benzene-pentacarboxylic, and mellitic acids), and the like; (3) vegetable, animal and fish oil such as carboxylic acids, saturated or unsaturated; and (4) the like.

Examples of oil-water streams may include, but not limited to: wet oil two-phase and/or three-phase separators; slope separators; wet oil gravity tanks; tail waters from de-hydrating oil, washing oil, de-salting oil, and combinations thereof; oil spills and/or discharges into surface water (e.g., seawater), groundwater and holding ponds from offshore and onshore platforms, offshore and onshore oil pipelines, oil shipping platforms, oil tankers, oil feedstock in power generation plants, and the like; produced water; deficient effluent streams from produced water treatment facilities, oily waste streams and oily stripping streams resulting from any conventional produced water de-oiling methods such as gravity-driven units (e.g., skim tanks and the like), centrifugal-driven units (e.g., hydrocyclones, centrifuges, and combinations thereof), filtration units (e.g., flotation, microfiltration, ultrafiltration, and combinations thereof), adsorption units (e.g., activated carbons, nutshells, manganese dioxide, and combinations thereof), and extraction units (e.g., micro-porous polymers, liquid solvents, supercritical fluids, and combinations thereof); oily aqueous streams resulting from oil processing and refining; oily aqueous streams resulting from chemical processing and treating; oily aqueous streams resulting from processing, recovering and treating vegetable, animal oil and fish oil; downhole wet oil separation; and the like.

The natural demulsification of oil-water starts in some oil reservoirs where oil might preferentially squeeze through the narrow pores of organically surface coated rocks (e.g., oil wet sandstone, limestone, dolomite, and combinations thereof) and trapped by impermeable rocks (e.g., clay or shale). In such a natural downhole capillary flow, no shear or differential velocity (velocity is in the direction of the flow) or oil droplets rotation are induced. Thus, capillary flow, especially with low capillary forces, is the most efficient method to separate oil from water.

My de-oiling/de-watering concept [U.S. Pat. Nos. 6,365, 051; 7,789,159; 7,934,551; 7,963,338; and 8,915,301] is analogous to the natural demulsification phenomenon of oil in reservoirs. The inventive concept utilizes the hydrophobic interactions between oil and water as immiscible fluids and a properly configured hydrophobic membrane would efficiently repel water (the non-wetting fluid) and allow oil (the membrane wetting fluid) to permeate through the hydrophobic membrane by applying a low pressure.

Hydrophobic interactions are thermodynamic phase and energy related phenomena. The Gibbs free energy, as given in Eq. (1), represents the energy of interactions between water and hydrophobic molecules. The mixing degree of water and hydrophobic molecules depends largely on the enthalpy, which may be re-expressed as follows:

$$\Delta H = 2\Delta H_{w-h} - \Delta H_{w-w} - \Delta H_{h-h} \quad (5)$$

where "w" is a water molecule and "h" is a hydrophobic molecule. Water and hydrophobic molecules would not mix if the water molecule and hydrophobic molecule made more favorable interactions with themselves ("w-w" and "h-h") than they would make with one another ("w-h"). On the other hand, mixing according to Eq. (1) would be favored by the entropy (the disordering property) and the mixing tendency would increase with temperature. However, in the absence of a hydrophobic molecule, the geometry of a polar water molecule in a pure aqueous phase is tetrahedron wherein the center of the water molecule is positioned in 6 possible hydrogen bonding configurations. When a water molecule in an aqueous phase is replaced by a neutral hydrophobic molecule that may not form a hydrogen bond, one of the edges of the tetrahedron water molecule collapses, thereby reducing the number of possible hydrogen bonding configurations to 3 (instead of 6). This, in turn, cuts the entropy of the central water molecule by 50%. Hydrophobic molecules aggregate together to minimize the hydrophobic surface interface exposed to water molecules, and thus the entropy may be expressed as follows:

$$\Delta S = S_w - S_h \quad (6)$$

where $S_w$ is the entropy in the water phase, and $S_h$ is the entropy on the hydrophobic surface interface. Eq. (6) implies that the less hydrophobic surface interface interacts with water, the higher the entropy (favors de-mixing), and thus the lower the Gibbs free energy. Therefore, hydrophobic interactions are a thermodynamic-driven process that seeks to minimize the free energy by minimizing the mixing between water and hydrophobic molecules.

Hydrophobic membranes are not based on size- or charge-exclusion such as hydrophilic filtration membranes wherein the membranes allow water to pass through and reject species based on their sizes (MF, UF, and RO) or charges (NF). In contrast, hydrophobic membranes do not permit passage of water through the membrane until the water capillary pressure ($p_c$) of the hydrophobic membrane is exceeded. $p_c$ depends on the interfacial tension, contact angle, and the pore size distribution of the hydrophobic membrane as reflected by the following relation:

$$p_c = \frac{2\tau_{w-o}\cos\theta_{w-o}}{r} \quad (7)$$

where $\tau_{w-o}$ is the water-oil interfacial tension, $\theta_{w-o}$ is the contact angle of a water droplet on the membrane surface in the presence of oil, r is the radius of the membrane pore. The value of the $\theta_{w-o}$ can be related to various interfacial tensions as follows:

$$\cos\theta_{w-o} = \frac{\tau_{m-w} - \tau_{m-o}}{\tau_{w-o}} \quad (8)$$

where $\tau_{m-w}$ is interfacial tension of a membrane in contact with water, and $\tau_{m-o}$ is the interfacial tension of the membrane in contact with oil. When $\tau_{m-w}$ is greater than $\tau_{m-o}$, the membrane is hydrophobic ($0 < \theta_{w-o} < 90°$), which means that the value of $p_c$ is positive and thus the membrane is oil wet that permits the passage of oil and repels water. However, when $\tau_{m-w}$ is lower than $\tau_{m-o}$, the membrane is hydrophilic ($\theta_{w-o} > 90°$). This means that the value of $p_c$ is negative, and the membrane is water wet that permits the passage of water and prevents oil from entering the membrane pores against the applied pressure ($p_a$).

My de-oiling/de-watering concept using hydrophobic membranes is equally applicable for separating organics from each other in organic-organic (non-aqueous) mixtures when the targeted organics in the mixture are not miscible with each other, and differ in their wettability of hydrophobic membranes.

Vertical Integration of Source Water Desalination

De-Scaling Source Water

Inspection of Table 1 (e.g., S1-S5) indicates that the ratio of calcium to magnesium in such source water, for example, is low (roughly about 0.2). On the other hand, the ratio of magnesium to sulfate is mostly about 2. Since magnesium concentration is nearly double sulfate concentration in such source water, magnesium would be a sufficient and appropriate precipitation sink for sulfate to be precipitated as a useful layered double hydroxides inorganic compound if it was supplemented with an appropriate trivalent cation along with a hydroxide source. The structure of such a compound would then stem from the basic structure of magnesium hydroxide, which is the octahedral of magnesium (six-fold coordinated to hydroxyl groups) that share edges to form stacked layers held together by hydrogen bonding. When some of the magnesium is replaced by a trivalent cation with nearly an equivalent ionic radius (e.g., $Al^{+3}$ or $Fe^{+3}$), a net positive charge is permanently generated in the hydroxyl layers. This net positive charge is balanced by an interlayer of negatively charged anions (e.g., sulfate in source water) that lies between the magnesium hydroxide-like layers. The free space of the interlayer is filled with water molecules. The structural features of such layered double hydroxides based-compound are thus dictated by the: (1) nature of the magnesium hydroxide-like layer; (2) identity of the anion or anions in the interlayer; and (3) way the magnesium hydroxide-like layers are stacked.

Calcium, as a relatively minor divalent cation in source water (Table 1: S1-S5), may be combined within the structure of the close packed configuration of the hydroxyl groups in the magnesium hydroxide-like layers. However, calcium has a larger ionic radius (0.98° A) than magnesium (0.65° A). In order to homogenously fit calcium within the octahedral structure of magnesium hydroxide-like layers, the ratio of calcium to magnesium in source water should be relatively low (e.g., about 0.2, Table 1: S1-S5). When source water (e.g., Table 1: S1-S5) is mixed with an appropriate amount of dolime, as explained above by this inventor ([0079]-[0087]), dolime may contribute nearly equivalent amounts of magnesium and calcium to source water. As such, the ratio of calcium to magnesium in source water upon mixing with dolime remains relatively low (e.g., about 0.28).

The de-scaling of source water (e.g., Table 1: S1-S5) can thus be conducted in a single precipitation stage wherein sulfate is precipitated in the form of magnesium as layered double hydroxides upon the addition of appropriate amounts of a hydroxide source, and either an aluminum source or an iron source. The precipitated layered double hydroxides based-compound would thus contain magnesium as the dominant divalent cation, and a trivalent cation (either aluminum or iron) in the outside layers while their interlayer contains mainly sulfate and water molecules. Within the outside layers, a fraction of the magnesium hydroxide sheets are substituted with either aluminum or iron, which provides permanent positive charge on the hydroxide layers. The positively charged hydroxide layers are counter-balanced by the negatively charged sulfate interlayer.

In this invention, there are several industrial advantages for precipitating such layered double hydroxides inorganic compounds from such source water (e.g., Table 1: S1-S5). First, their interlayers are highly exchangeable. Second, their exchanged interlayers can be re-activated or re-substituted for reuse. Third, they are valuable precipitating additives since each compound, by itself, constitutes a complete source for a divalent cation (e.g., magnesium), a trivalent cation (either aluminum or iron) and hydroxides.

Thus, in one embodiment of this invention, source water is de-carbonated by using either an aluminum source or an iron source to reduce the pH of source water, thereby converting the naturally present bicarbonate in source water to carbon dioxide. Source water is then de-aerated to remove carbon dioxide and produce de-carbonated source water. The removal of carbon dioxide can be achieved by, but not limited to, hydrophobic membranes. Yet, a further innovative purpose for using either the aluminum source or the iron source is that the carried over trivalent cation (either aluminum or iron) with the de-carbonated source water is also utilized to precipitate sulfate upon mixing with an organic solvent as a hydroxide source, and further upon mixing with a magnesium source, as needed, to balance magnesium concentration in source water. The magnesium source is selected from the group consisting of dolime, magnesium oxide, magnesium hydroxide, and combinations thereof. The preference of using such magnesium sources is that they also serve as hydroxide sources. However, magnesium sources are not limited to dolime, magnesium oxide and magnesium hydroxide, providing that a hydroxide source is present (e.g., an organic solvent). As such, any inorganic compound comprises magnesium may be used in this invention as a magnesium source. The use of dolime in this invention is to produce neither magnesium hydroxide, nor gypsum, nor calcium chloride, nor combinations of such compounds (see [0085]; [0086]).

Figure 15A:
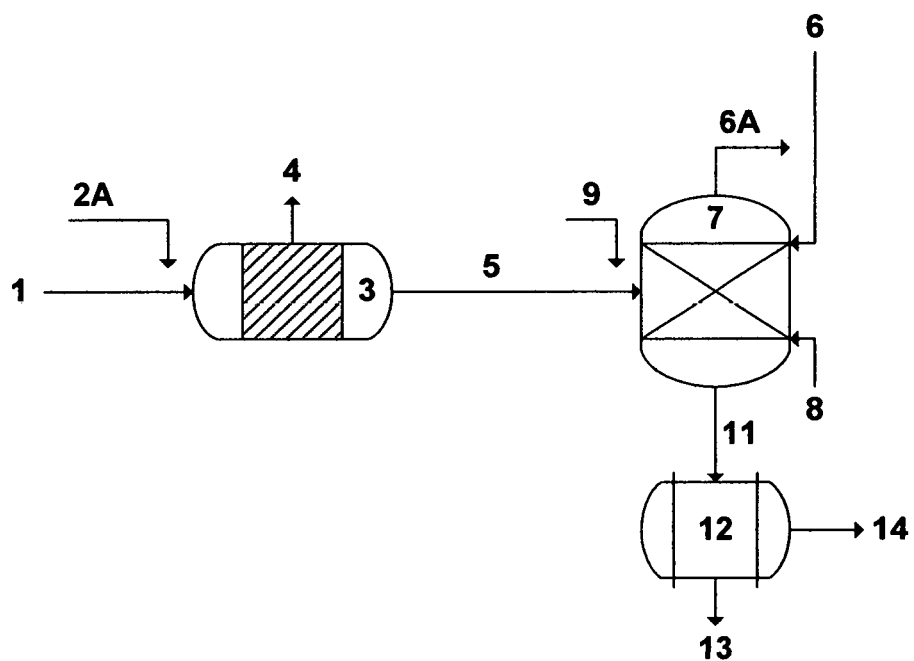
FIG. 15A illustrates a possible flow diagram for the inventive de-scaling method.

Accordingly, FIG. 15A depicts an oversimplified flow diagram for the inventive method to treat source water. Source water [1] is mixed with either an aluminum source or an iron source [2A] to convert at least a portion of the naturally present bicarbonate in source water to carbon dioxide. A de-aerator [3] is then used to remove carbon dioxide [4] from source to produce de-carbonated source water [5]. The aluminum source is selected from the group consisting of aluminum chloride, aluminum chlorohydrate, aluminum nitrate, aluminum sulfate, aluminum acetate, aluminum formate, and combinations thereof. The iron source is selected from the group consisting of iron chloride, iron chlorohydrate, iron nitrate, iron sulfate, iron acetate, iron formate, and combinations thereof. Other aluminum or iron sources may also be used in this invention. The de-carbonated source water [5] may be further treated to precipitate sulfate. As such, the de-carbonated source water [5] is mixed with an organic solvent [6] to form precipitates comprising sulfate (either magnesium sulfoaluminate upon mixing with the aluminum source or magnesium sulfoferrate upon mixing with the iron source) in a precipitator unit [7]. The organic solvent [6] accelerates precipitation by reaching a very high level of supersaturation within a very short period of time, which enormously simplifies the design of the precipitator unit [7] in terms of size (a compact modular design with a very short retention time) and effectiveness (a fast precipitation of either magnesium sulfoaluminate or magnesium sulfoferrate). The organic solvent is selected from the group consisting of isopropylamine, propylamine, dipropylamine, diisopropylamine, ethylamine, diethylamine, methylamine, dimethylamine, ammonia, and combinations thereof. A gas [8] is fed near the bottom of the precipitator unit [7] to recover the organic solvent. The gas is selected from the group consisting of nitrogen, air, water vapor, and combinations thereof. The recovered amine solvent [6A] is recycled for reuse in the precipitator unit [7]. A magnesium source [9] may also be mixed with the de-carbonated source water [5] to balance, as needed, magnesium concentration in the de-carbonated source water [5]. The magnesium source is selected from the group consisting of dolime, magnesium oxide, magnesium hydroxide, and combinations thereof. The outlet stream [11] from the precipitator unit [7] is fed to a filter [12] to remove the precipitates [13] and produce de-scaled source water [14].

In another embodiment, source water is de-carbonated by using an organic solvent in an anionated form to reduce the pH of source water, thereby converting the naturally present bicarbonate in source water to carbon dioxide. Source water is then de-aerated to remove carbon dioxide and produce de-carbonated source water. The removal of carbon dioxide can be achieved by, but not limited to, hydrophobic membranes. Yet, a further innovative purpose for using the organic solvent in the anionated form is that the carried over organic solvent with the de-carbonated source water can be regenerated, and thus further utilized to precipitate sulfate from the de-carbonated source water upon mixing with either aluminum hydroxide or iron hydroxide, and further upon mixing with a magnesium source.

Figure 15B:
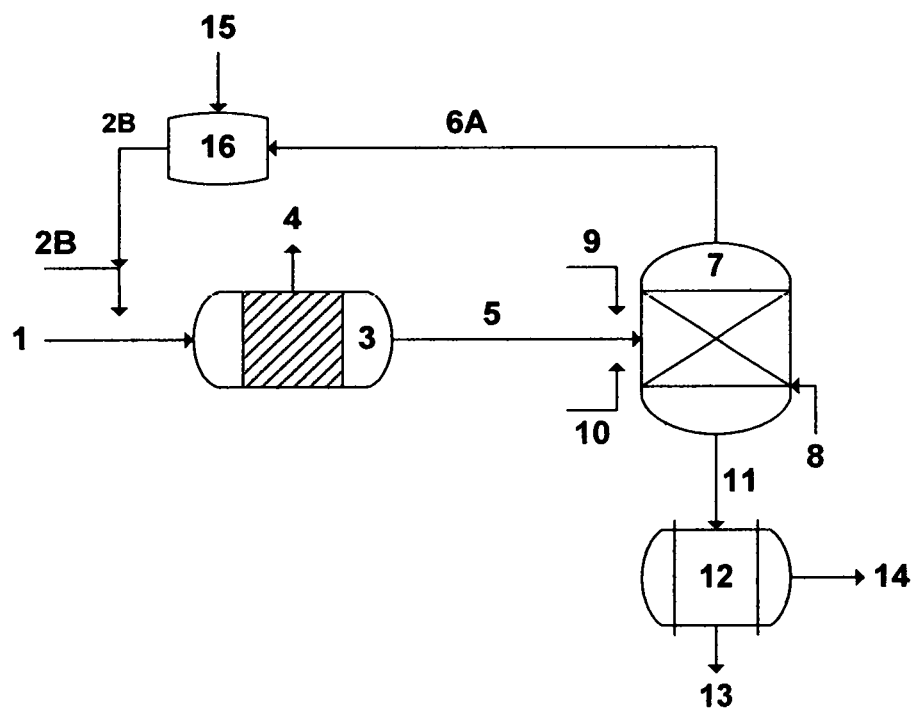
FIG. 15B illustrates another possible flow diagram for the inventive de-scaling method.

Accordingly, and as shown in FIG. 15B, source water [1] is mixed with an organic solvent in an anionated form [2B], to convert at least a portion of the naturally present bicarbonate in source water to carbon dioxide. A de-aerator [3] is then used to remove carbon dioxide [4] from source to produce de-carbonated source water [5]. The organic solvent is selected from the group consisting of isopropylamine, propylamine, dipropylamine, diisopropylamine, ethylamine, diethylamine, methylamine, dimethylamine, ammonia, and combinations thereof. The anionated form is selected from the group consisting of chloride, chlorohydrate, nitrate, sulfate, phosphate, acetate, formate, and combinations thereof. The de-carbonated source water [5] may be further treated to precipitate sulfate. As such, the de-carbonated source water [5] is mixed with either aluminum hydroxide or iron hydroxide [10] to regenerate the organic solvent from it is anionated form, and to form precipitates comprising sulfate (either magnesium sulfoaluminate upon mixing with aluminum hydroxide or magnesium sulfoferrate upon mixing with iron hydroxide) in a precipitator unit [7]. A gas [9] is fed near the bottom of the precipitator unit [7] to recover the regenerated organic solvent [6A]. The gas is selected from the group consisting of nitrogen, air, water vapor, and combinations thereof. A magnesium source [9] may also be mixed with the de-carbonated source water [5]. The magnesium source is selected from the group consisting of dolime, magnesium oxide, magnesium hydroxide, and combinations thereof. The recovered organic solvent [6A] is reacted with an acid [15] in-line (not shown in FIG. 15B) or in a vessel [16] to produce the organic solvent in the anionated form [2B] for reuse in the inventive method. The acid is selected from the group consisting of hydrochloric acid, chloral hydrate, nitric acid, sulfuric acid, phosphoric acid, citric acid, acetic acid, formic acid, and combinations thereof. The outlet stream [11] from the precipitator unit [7] is fed to a filter [12] to remove the precipitates [13] and produce de-scaled source water [14].

Figure 15C:
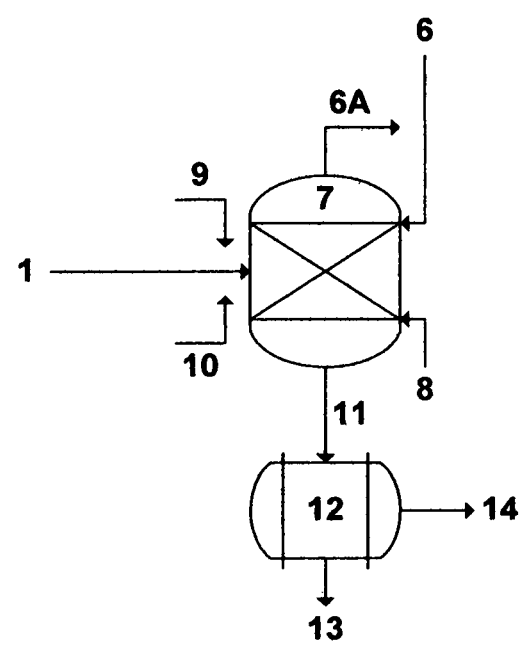
FIG. 15C illustrates a further possible flow diagram for the inventive de-scaling method.

In yet another embodiment, sulfate can be precipitated from source water upon mixing with an organic solvent, and either aluminum hydroxide or iron hydroxide. Here, the naturally present bicarbonate in source water is converted to carbonate and precipitated as such. As depicted in FIG. 15C, source water [1] is mixed with either aluminum hydroxide or iron hydroxide [10], and an organic solvent [6] to form precipitates comprising either magnesium sulfoaluminate (upon mixing with aluminum hydroxide) or magnesium sulfoferrate (upon mixing with iron hydroxide) in a precipitator unit [7]. The organic solvent is selected from the group consisting of isopropylamine, propylamine, dipropylamine, diisopropylamine, ethylamine, diethylamine, methylamine, dimethylamine, ammonia, and combinations thereof. A magnesium source [9] may also be mixed with source water [1], as needed, to balance magnesium concentration in source water [1]. The magnesium source is selected from the group consisting of dolime, magnesium oxide, magnesium hydroxide, and combinations thereof. A gas [8] is fed near the bottom of the precipitator unit [7] to recover the organic solvent. The recovered organic solvent [6A] is recycled for reuse in the precipitator unit [7]. The gas is selected from the group consisting of nitrogen, air, water vapor, and combinations thereof. The outlet stream [11] from the precipitator unit [7] is fed to a filter [12] to remove the precipitates [13] and produce de-scaled source water [14].

Source water is selected from the group consisting of seawater, cooling water, a reject stream from a desalination method, a spent stream from flue gas de-sulfurization, source water comprises sulfate, and combinations thereof.

The precipitation of magnesium sulfoaluminate or magnesium sulfoferrate takes place based on the conditions under which it is effectively precipitated. Based on the inventor's testing, the removal of sulfate from source water in the form of either magnesium sulfoaluminate or magnesium sulfoferrate in all of the above embodiments is consistently about 98%. One structural formula that may generally describe certain embodiments of magnesium sulfoaluminate or magnesium sulfoferrate is as follows:

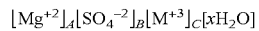

where A is the stoichiometric amount of magnesium ($Mg^{+2}$), B is stoichiometric amount of sulfate ($SO_4^{-2}$), C is the stoichiometric amount of the trivalent cation ($M^{+3}$; which is either aluminum: $Al^{+3}$ or iron: $Fe^{+3}$), and x is the hydration content. Depending on the amount of sulfate in source water, the chemistry of source water, and the basicity condition under which sulfate is precipitated in the form of either magnesium sulfoaluminate or magnesium sulfoferrate, the stoichiometric ratio (meq./L) of sulfate to magnesium (B/A) is 0.1 to 0.6, the stoichiometric ratio (meq./L) of sulfate to the trivalent cation (B/C) is 0.4 to 1.1, and the hydration content (x) is 1.0 to 1.5.

The de-scaled source water by the inventive de-scaling methods (as given in FIGS. 15A, 15B and 15C, and described above) may be used for hydrocarbons recovery.

The de-scaled source water by the inventive de-scaling methods (as given in FIGS. 15A, 15B and 15C, and described above) may be used as a feed stream to substantially improve the performance of any desalination method. The desalination method is selected from the group consisting of recycle-brine multi-stage flash (RB-MSF) desalination, once-through multi-stage flash (OT-MSF) desalination, multi-effect distillation, thermal vapor compression, mechanical vapor compression, vacuum membrane distillation, membrane distillation, osmotic membrane distillation, reverse osmosis, nanofiltration, forward osmosis, pervaporation, electrodialysis, and combinations thereof. If the inventive de-scaling methods are integrated with a desalination method, the remaining salts in de-scaled source water [14] will be essentially sodium-potassium chloride. With such integration, nearly any desalination method, except pressure-driven methods (e.g., reverse osmosis due to the osmotic pressure limitation), may reject brine at a level not exceeding 250,000 mg/L of TDS.

De-Scaling/De-Salting Source Water

Figure 6:
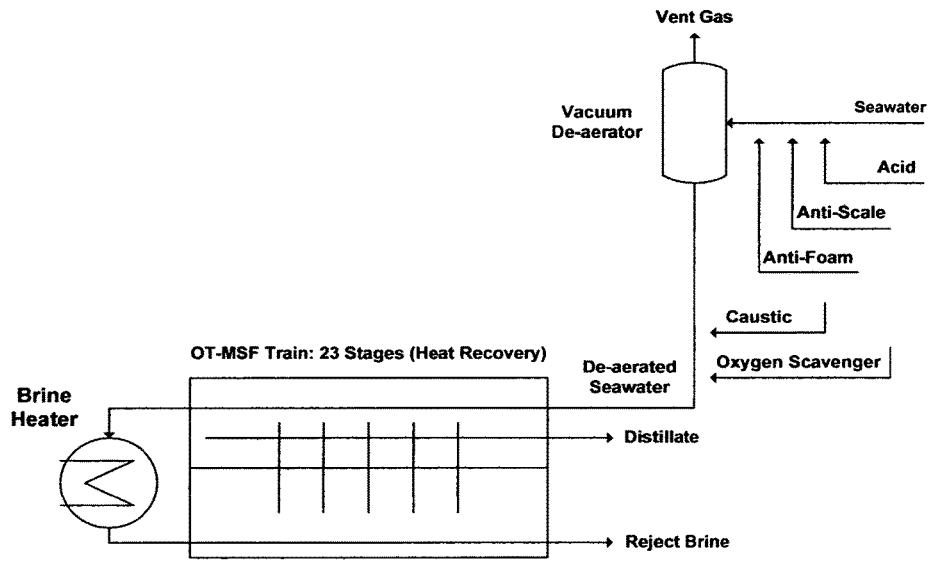
FIG. 6 illustrates simplified configurations for an OT-MSF desalination train and an RB-MSF desalination train to de-salt seawater.
Figure 6:
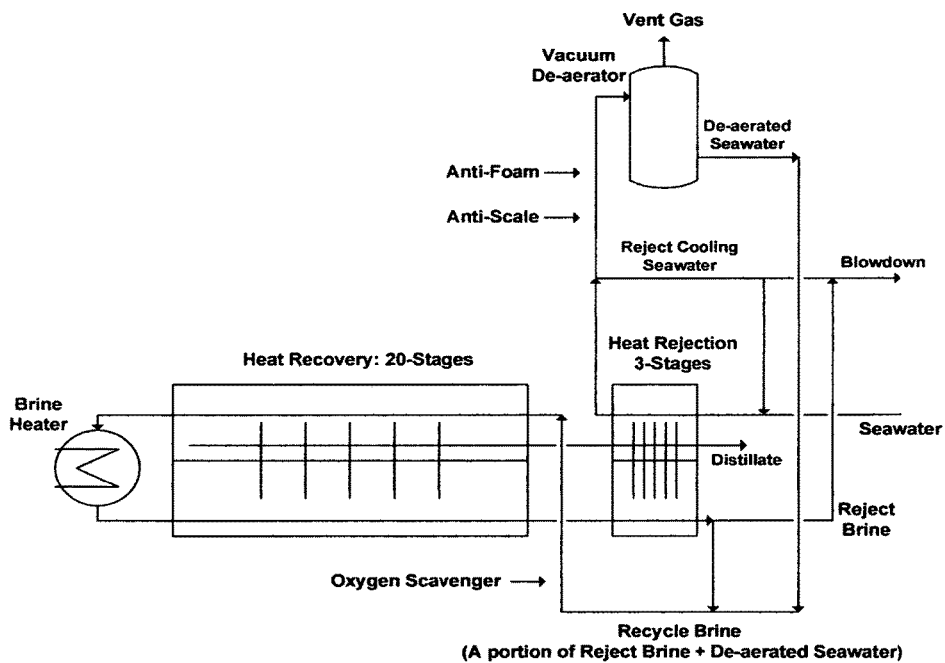

As highlighted above ([0012]-[0016]), RB-MSF desalination plants are dominant over the past 20 years and produce over 80% of all de-salted water in the world. A conventional RB-MSF desalination plant comprises a plurality of RB-MSF trains, typically but not necessarily, eight RB-MSF trains. An RB-MSF train is thus an integral part of an RB-MSF desalination plant. However, each RB-MSF train in a desalination plant is operated independently, meaning each RB-MSF train has its own feed of source water, source water conventional pre-treatment (see e.g., FIG. 6, Configuration B), heat rejection section, heat recovery section, cooling source water, reject cooling source water, recycle brine, and heavily scale-infested reject brine. The heat rejection section of an RB-MSF train typically comprises 3 flashing stages while the heat recovery section typically comprises 20 flashing stages. The limitation on the number of the flashing stages, particularly in the heat recovery section, is dictated by the saturation envelops of calcium sulfate hydrates (hemihydrate and anhydrite) thereby limiting the top brine temperature to 110° C. (see e.g., FIG. 2)

As intrinsically analyzed by this inventor [e.g., U.S. patent application Ser. Nos. 14/544,317 and 14/544,436], the ratio of distillate to total feed of source water is about 10%, which is an unmatched inefficiency in terms of distillate recovery ratio, enormous pumping power of the total feed of source water, and high conventional pre-treatment costs of source water. In addition, the amount of recycle brine is nearly equivalent to the total feed of source water, which also requires an enormous pumping power as well as treatment with at least scale inhibitors and oxygen scavengers, and therefore recycle brine is the inherent disadvantage of an RB-MSF desalination plant. Furthermore, the volume of heavily scale infested reject brine that must be returned back to a sea is also enormous. Such reject brine increases TDS, including all of the concentrated scale-prone ions (magnesium, calcium and sulfate), around seawater intake lines. As such, it deteriorates the natural ions composition of source water (e.g., seawater), thereby imposing different sets of operating conditions on RB-MSF desalination plants, which forces a departure from the original operating conditions as the plants were originally designed.

The inventive de-scaling methods would clearly aid RB-MSF desalination plants by intrinsically obviating scale issues (unlike conventional source water pre-treatment, which is aimed at avoiding, not removing, scale); increasing distillate recovery and performance ratios; reducing the volumes of source water for cooling, source water for feeding plants, recycle brine and reject brine; and yet producing scale-depleted reject brine. However, the required pumping power for using and rejecting an enormous volume of source water for cooling, and constantly re-circulating an enormous volume of recycle brine still remains significant, which is the inherited disadvantage of the RB-MSF desalination concept.

Alternatively, what I coined the Brine-Forward MSF (BF-MSF) desalination concept in conjunction with the above described inventive de-scaling methods obviate the underlying disadvantage of the RB-MSF desalination concept, the dominant concept in de-salting source water. The inventive BF-MSF desalination system (plant) comprises a plurality of trains arrange in series, in which each train comprises a brine heater and a heat recovery section, except a last train that comprises a brine heater, a heat recovery section and a heat rejection section. Each train is operated at a preselected concentration factor, each train produces distillate and brine, brine from each train, except the last train, passes through to feed the next succeeding train thereby each train progressively possesses a higher level of TDS than a previous train, and brine from the last train is rejected at a level not exceeding 250,000 mg/L of TDS. Thus, the BF-MSF desalination system is a multi-boiling system without supplying additional heat after the brine heater of each train, and a multi-concentration system without supplying additional de-scaled source water after the first train. With the aid of the inventive de-scaling methods, the inventive BF concept is also applicable to multi-effect distillation, membrane distillation, vapor recompression, and the like.

Figure 16A:
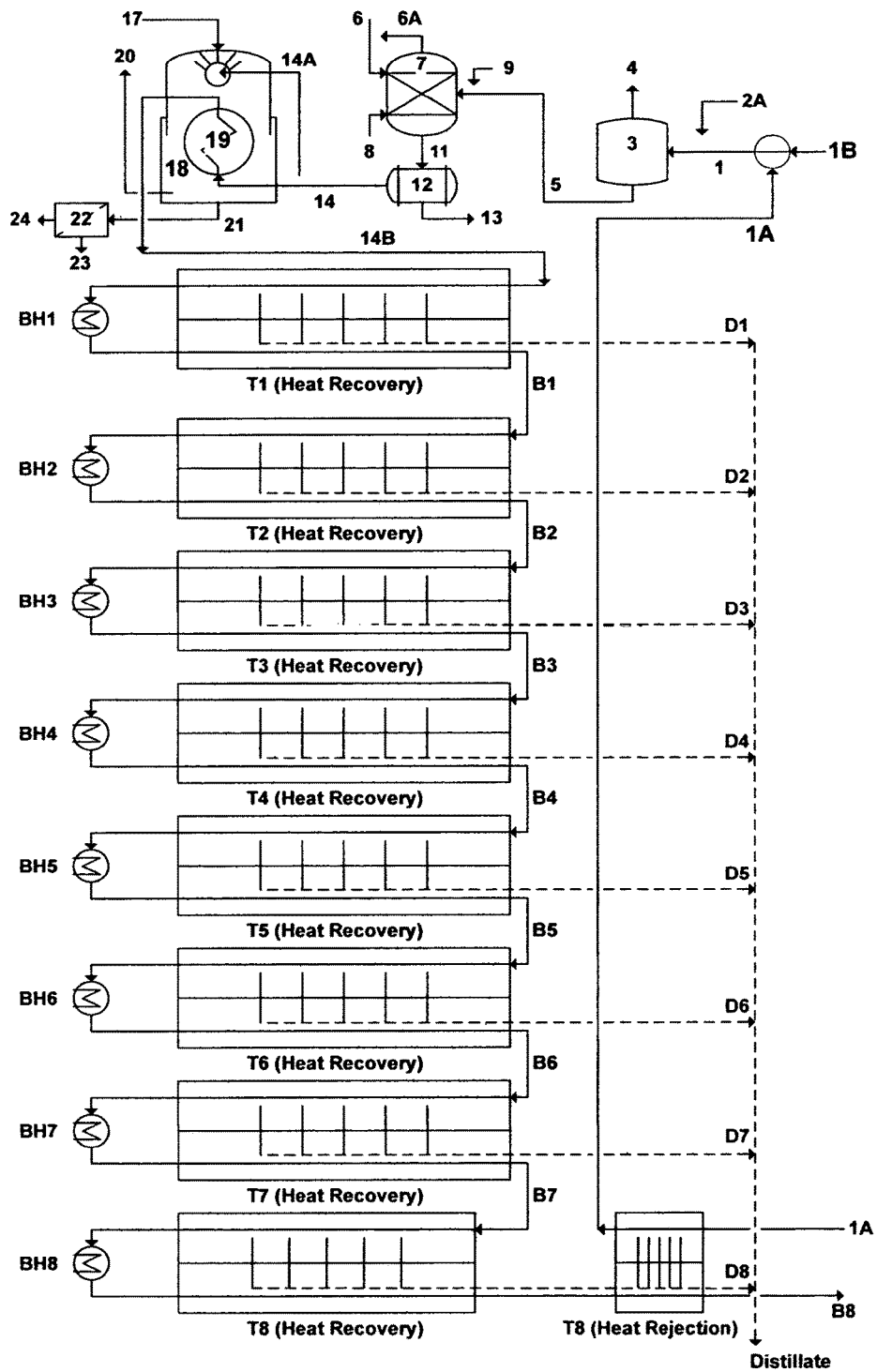
FIG. 16A illustrates a possible flow diagram for the inventive vertical integration of source water desalination.
Figure 16B:
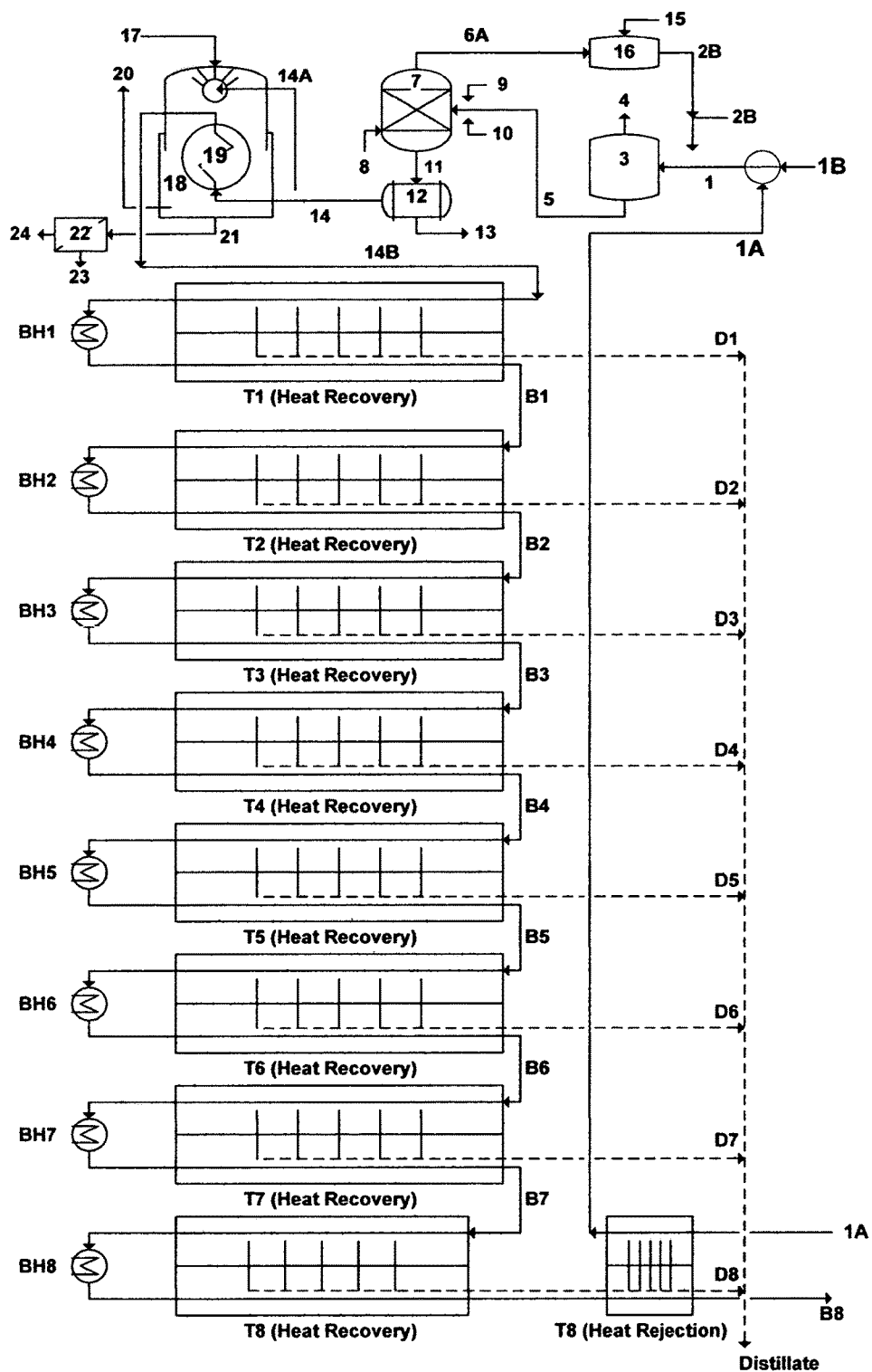
FIG. 16B illustrates another possible flow diagram for the inventive vertical integration of source water desalination.
Figure 16C:
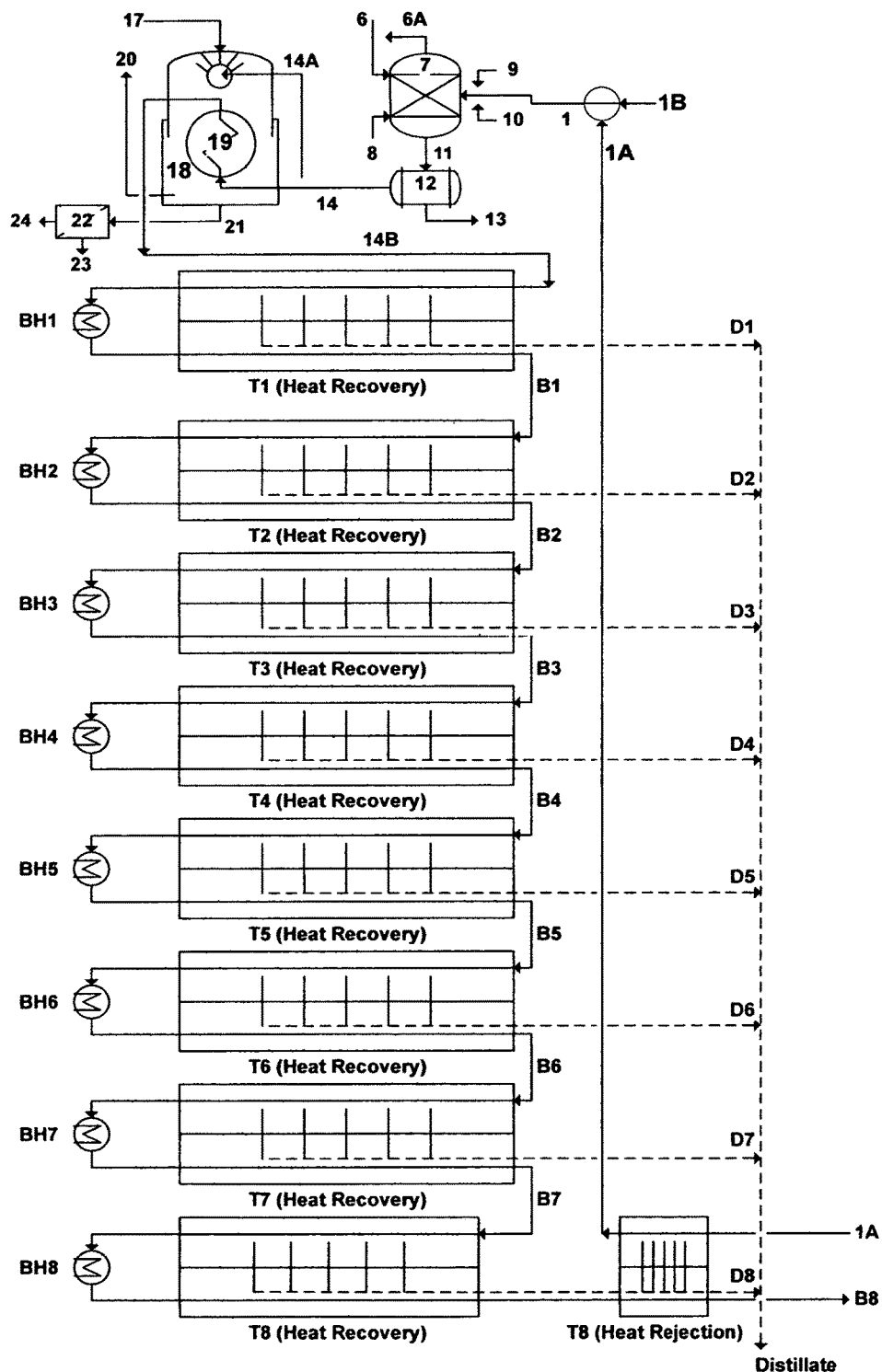
FIG. 16C illustrates a further possible flow diagram for the inventive vertical integration of source water desalination.

For a strictly illustrative purpose, the inventive BF-MSF desalination system, as shown in FIGS. 16A, 16B and 16C, comprises eight BF-MSF trains [T1 to T8], and each train comprises a brine heater [BH1 to BH8]. As such, the inventive BF-MSF desalination system distinctly differs from an RB-MSF desalination plant in that: (1) each train of the inventive BF-MSF desalination system is designed for heat recovery, except the last train wherein the last train comprises a heat recovery section, and a heat rejection section to condense more distillate from flashing brine at low temperatures (40-33° C.) before rejecting brine; (2) source water is used for cooling in the only heat rejection section of the BF-desalination system, which is only part of the last train; and (3) the cooling source water [1A] that gains some heat as it exits the heat rejection section of the last train [T8] is completely used as source water [1] to be de-scaled by the inventive de-scaling methods, thereby entirely eliminating reject cooling source water. The cooling source water [1A] in the BF-MSF desalination system may be supplemented, as needed, with a further amount of source water [1B] to compose the required source water [1].

As illustrated in FIGS. 16A, 16B and 16C, source water [1] comprises two portions [1A and 1B]. The first portion of source water [1A] passes through the heat rejection section of the last train [T8] of the BF-MSF desalination system to condense more distillate [D8] from flashing brine in the heat rejection section of the last train [T8]. The second portion of source water [1B] may supplement, as needed, the first portion of source water [1A] to compose the required source water [1] to feed the BF-MSF desalination plant.

In one embodiment, the required source water [1] is de-scaled by the inventive steps [1, 2A, 3, 4, 5, 6, 6A, 7, 8, 9, 11, 12, 13, and 14] as shown in FIG. 16A, which are the same steps as also shown in FIG. 15A and described above.

In another embodiment, the required source water [1] is de-scaled by the inventive steps [1, 2B, 3, 4, 5, 6, 6A, 7, 8, 9, 10, 11, 12, 13, 14, 15 and 16] as shown in FIG. 16B, which are the same steps as also shown in FIG. 15B and described above.

In yet another embodiment, the required source water [1] is de-scaled by the inventive steps [1, 6, 6A, 7, 8, 9, 10, 11, 12, 13 and 14] as shown in FIG. 16C, which are the same steps as also shown in FIG. 15C and described above.

The heat rejection section of the last train [T8], as shown in FIGS. 16A, 16B and 16C, may be eliminated (the last train would be only for heat recovery), thereby eliminating the first portion of source water [1A], and thus the second portion of source water [1B] would constitute source water [1] to be de-scaled by the inventive de-scaling methods.

The second portion of source water [1B], as shown in FIGS. 16A, 16B and 16C, may be eliminated, thereby the first portion of source water [1A] that passes through the heat rejection section of the last train [T8] would constitute source water [1] to be de-scaled.

The de-scaled source water [14] by the inventive de-scaling methods can be fed directly to the first train [T1] of the BF-MSF desalination system (not shown in FIGS. 16A, 16B and 16C). The de-scaled source water [14] may also be mixed with an oxygen scavenger or subjected to further de-aeration, if needed, before it is fed to the first train [T1] of the BF-MSF desalination plant (not shown in FIGS. 16A, 16B and 16C). The brine forward concept is then applied wherein brine from each train passes through to feed the next train of the BF-MSF desalination system (e.g., brine [B1] from the first train [T1] feeds the second train [T2] and so forth in going down the trains to the last train [T8], wherein brine [B8] is rejected at a level not exceeding 250,000 mg/L of TDS), each train is operated at a preselected concentration factor thereby each train possesses a higher concentration factor of brine than the previous train. As such, the inventive BF concept allows consecutive increase in the concentration factor of brine in going down the trains. Each train [T1 to T8] produces distillate [D1 to D8].

Since source water is de-scaled by the inventive de-scaling methods, reject brine [B8] from the inventive BF-MSF desalination system is subsequently depleted of scale prone species (as well as oxygen). As such, reject brine [B8] may be used as a readily stream in applications comprise hydrocarbons recovery, chlor-alkali industries, and road de-icing salts.

Figure 2:
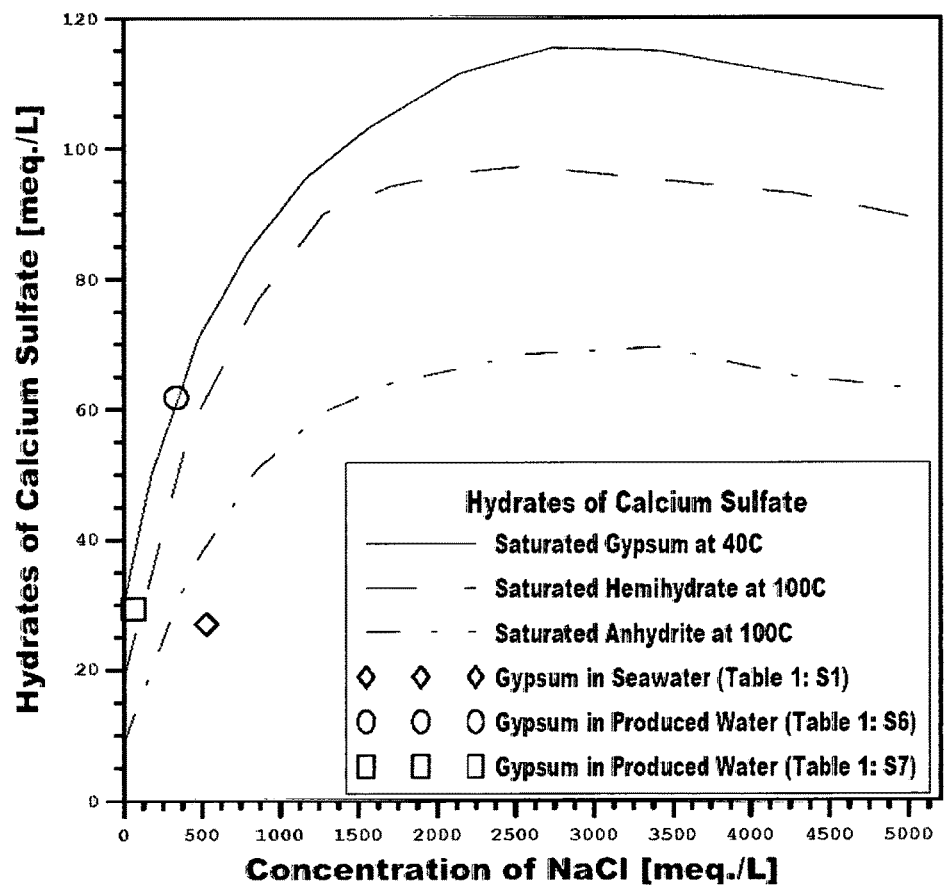
FIG. 2 illustrates the saturation limits of calcium sulfate hydrates as a function of sodium chloride concentrations.
Figure 3:
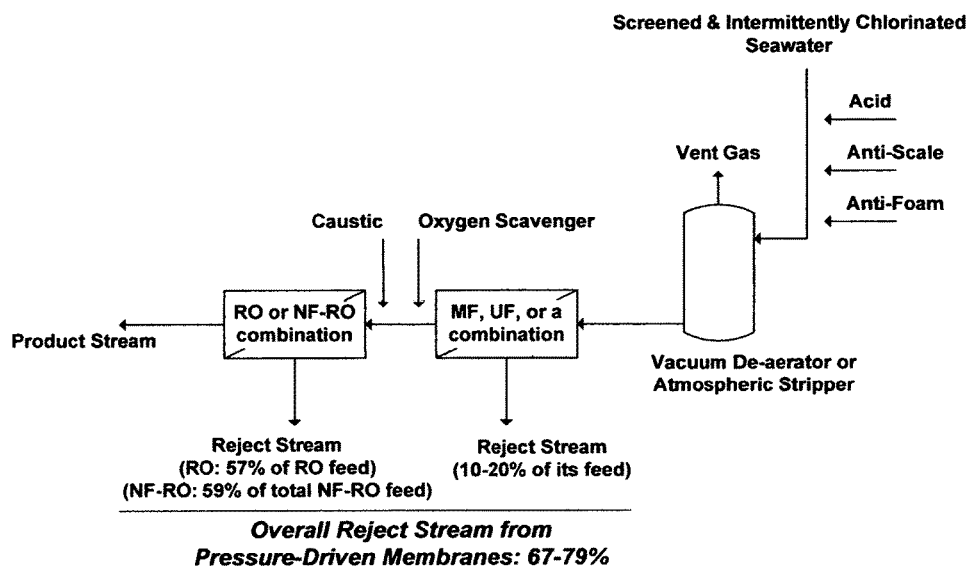
FIG. 3 illustrates a possible flow diagram for seawater treatment by combinations of pressure-driven membranes.

The inventive de-scaling methods lift the imposed restriction on the top brine temperature (due to the saturation envelops of hemihydrate and anhydrite, FIG. 2), and thus provide a much needed flexibility in designing the inventive BF-MSF desalination system. As such, the inventive de-scaling methods may facilitate the pairing of two trains with one brine heater or expanding the number of flashing stages of each train at a higher flashing range (e.g., 100° C.) since the top brine temperature is extendable to 150° C. As such, capturing waste heat energy from flue gas, for example, which is typically and immensely emitted from power-source water desalination co-generation plants, and transferring it to the de-scaled source water [14] is an innovative economic benefit for the inventive the BF-MSF desalination system (heating the de-scaled source water [14B] before feeding it to the first train [T1] of the BF-MSF desalination system as shown in FIGS. 16A, 16B and 16C. An additional innovative environmental benefit is the scrubbing of flue gas [17] by a slip stream [14A] of the de-scaled source water [14], as also shown in FIGS. 16A, 16B and 16C. Yet, further innovative industrial and environmental benefits are attainable by absorbing $SO_2$ from flue gas and liberating $CO_2$ [20], as also shown in FIGS. 16A, 16B and 16C, thereby utilizing the liberated $CO_2$ [20] as a readily fluid in applications, for example, comprise hydrocarbons recovery.

The de-scaled source water [14] resulting from the inventive de-scaling methods is mildly basic (e.g., the pH may be within about 8.5-9.5). As shown in FIGS. 16A, 16B and 16C, a slip stream [14A] of the de-scaled source water [14] is contacted with flue gas [17] in scrubber [18], wherein the scrubber comprises a heat exchanger [19], to scrub flue gas [17] by the slip stream [14A] of the de-scaled source water [14], and yet to condense flue gas [17] by passing the de-scaled source water [14] through the heat exchanger [19] to indirectly exchange most of the sensible heat and some of the latent heat within flue gas [17] with the de-scaled source water [14], thereby absorbing $SO_2$ from flue gas, liberating $CO_2$ [20], generating a spent slip stream [21], and heating the de-scaled source water [14B]. The heated de-scaled source water [14B] is then fed to the first train [T1] of the BF-MSF desalination system (as shown in FIGS. 16A, 16B and 16C) wherein the brine forward concept, as described above, is applied. The liberated $CO_2$ can be used, as a readily fluid, in applications comprise hydrocarbons recovery. The spent slip stream [21] from the scrubber [18] passes through a filter [22] to remove particulate [23] and produce a filtered slip stream [24], which may be recycled back to source water [1] or disposed of. An alternative option (not shown in FIGS. 16A, 16B and 16C) is to re-circulate the spent slip stream [21] through the scrubber [18], bleed at least a portion of the spent slip stream [21], and substitute the bled portion with an equivalent portion of the slip stream [14A] of the de-scaled source water [14] to balance the bled portion of the spent slip stream [21] and maintain the pH in the scrubber [18] within about 5.5-6.

As such, the vertical integration of source water desalination is attained in this invention by the inventive de-scaling methods that facilitate: (1) the development of the inventive BF-MSF desalination system, which eliminates recycle brine, eliminates reject cooling water, maximizes distillate production, minimizes the volume of reject brine, and produces scale-depleted reject brine that can be directly utilized as a suitable stream for industrial applications; and (2) scrubbing flue gas, which, in turn, facilitates heating the de-scaled source water to economically feed the inventive BF-MSF desalination system (e.g., reduce the required steam load in brine heaters), and yet absorbing $SO_2$ and liberating $CO_2$ as a readily fluid for industrial applications thereby protecting the environment.

TABLE 1

Samples of Source Water.

| Ion (meq./L) | S1 | S2 | S3 | S4 |
|---|---|---|---|---|
| $Na^+$ | 529.1 | 873.5 | 1,091.4 | 692.6 |
| $K^+$ | 10.7 | 26.2 | 18.9 | 12.1 |
| $Mg^{+2}$ | 125.9 | 191.7 | 209.6 | 332.1 |
| $Ca^{+2}$ | 27 | 41.9 | 47.2 | 52.5 |
| $Sr^{+2}$ | 0.2 | 0.5 | | 0.5 |
| $Cl^-$ | 623 | 1,020.1 | 1,181.2 | 823.5 |
| $HCO_3^-$ | 2.3 | 4.2 | 3.4 | 8.2 |

TABLE 1-continued

Samples of Source Water.

| | | | | |
|---|---|---|---|---|
| $SO_4^{-2}$ | 64.6 | 106.2 | 114.6 | 251.6 |
| $MgCl_2/\Sigma Mg$ | 0.68 | 0.67 | 0.68 | 0.38 |
| $Ca^{+2}/SO_4^{-2}$ | 0.42 | 0.40 | 0.41 | 0.21 |
| $Ca^{+2}/Mg^{+2}$ | 0.21 | 0.22 | 0.23 | 0.16 |
| $Mg^{+2}/SO_4^{-2}$ | 1.95 | 1.81 | 1.83 | 1.32 |

| Ion (meq./L) | S5 | S6 | S7 |
|---|---|---|---|
| $Na^+$ | 1613.8 | 337.0 | 59.2 |
| $K^+$ | 32.6 | 9.7 | 3.1 |
| $Mg^{+2}$ | 384.0 | 49.4 | 22.3 |
| $Ca^{+2}$ | 82.4 | 117.5 | 55.1 |
| $Sr^{+2}$ | | 1.6 | 0.7 |
| $Cl^-$ | 1900.2 | 462.6 | 96.5 |
| $HCO_3^-$ | 4.0 | 26.6 | |
| $SO_4^{-2}$ | 197.0 | 61.5 | 28.1 |
| $MgCl_2/\Sigma Mg$ | 0.70 | | |
| $Ca^{+2}/SO_4^{-2}$ | 0.42 | 1.91 | 1.96 |
| $Ca^{+2}/Mg^{+2}$ | 0.21 | 2.38 | 2.18 |
| $Mg^{+2}/SO_4^{-2}$ | 1.95 | 0.80 | 0.80 |

S1: Seawater; S2: RO reject stream from seawater treatment at 43% overall recovery ratio; S3: RB-MSF reject brine from seawater treatment; S4: NF reject stream from seawater treatment at 75% overall recovery ratio; S5: reject stream from flue gas de-sulfurization (spent seawater makeup); S6: produced water; S7: produced water; $\Sigma Mg=MgCl_2+MgSO_4$.

What is claimed is:

1. A method for treating a water source containing carbonates and sulfate, said method comprising the steps of producing de-carbonated water stream by: (i) mixing said water source containing carbonates and sulfate with an aluminum source selected from the group consisting of aluminum chloride, aluminum chlorohydrate, aluminum nitrate, aluminate sulfate, aluminum acetate, aluminum formate and combinations thereof; or an iron source selected from the group consisting of iron chloride, iron chlorohydrate, iron nitrate, iron sulfate, iron acetate, iron formate and combinations thereof; and (ii) de-aerating the treated water of step (i) to remove carbon dioxide and to produce said de-carbonated water stream.

2. The method of claim 1, wherein step (ii) further comprises the step of de-scaling said de-carbonated water stream, wherein said de-carbonated water stream is mixed with an organic solvent, a magnesium source, and combinations thereof, to from precipitates comprising magnesium sulfoaluminate or magnesium sulfoferrate in a precipitation unit; recovering at least a portion of said organic solvent by introducing a stream of an inert gas into said precipitation unit, wherein said inert gas is selected from the group consisting of nitrogen, air, water vapor, and combinations thereof; and filtering said precipitates to produce a de-scaled water stream.

3. The method of claim 2, wherein said organic solvent is selected from the group consisting of isopropylamine, propylamine, dipropylamine, diisopropylamine, ethylamine, diethylamine, methylamine, dimethylamine, ammonia, and combinations thereof.

4. The method of claim 2, wherein said magnesium source is selected from the group consisting of dolime, magnesium oxide, magnesium hydroxide, and combinations thereof.

5. A method for treating a water source containing carbonates and sulfate, said method comprising the steps of producing de-carbonated water stream by: (i) mixing said water source containing carbonates and sulfate with an organic solvent in an anionated form; wherein said organic solvent is selected from the group consisting of isopropylamine, propylamine, dipropylamine, diisopropylamine, ethylamine, diethylamine, methylamine, dimethylamine, ammonia, and combinations thereof; and wherein said anionated form is selected from the group consisting of chloride, chlorohydrate, nitrate, sulfate, phosphate, acetate, formate, and combinations thereof; and (ii) de-aerating the treated water of step (i) to remove carbon dioxide and to produce said de-carbonated water stream.

6. The method of claim 5, wherein step (ii) further comprises the step of de-scaling said de-carbonated water stream, wherein said de-carbonated water stream is mixed with aluminum hydroxide or iron hydroxide to regenerate said organic solvent, and to form precipitates comprising either magnesium sulfoaluminate or magnesium sulfoferrate in a precipitator unit; recovering at least a portion of said organic solvent by introducing a stream of an inert gas into said precipitation unit, wherein said inert gas is selected from the group consisting of nitrogen, air, water vapor, and combinations thereof; and filtering said precipitates to produce a de-scaled water stream.

7. The method of claim 6, wherein said de-carbonated water stream further comprises the step of mixing said de-carbonated source water with a magnesium source, said magnesium source is selected from the group consisting of dolime, magnesium oxide, magnesium hydroxide, and combinations thereof.

8. The method of claim 6, comprising the step of reacting the recovered said organic solvent with an acid to produce said organic solvent in an anionated form, said acid is selected from the group consisting of hydrochloric acid, chloral hydrate, nitric acid, sulfuric acid, phosphoric acid, citric acid, acetic acid, formic acid, and combinations thereof.

9. A method for treating a water source containing carbonates and sulfate, said method comprising the steps of producing de-scaled water stream by: (i) mixing said water source containing carbonates and sulfate with an organic solvent, a magnesium source, and combinations thereof, and aluminum hydroxide or iron hydroxide to from precipitates comprising magnesium sulfoaluminate or magnesium sulfoferrate in a precipitation unit; recovering at least a portion of said organic solvent by introducing a stream of an inert gas into said precipitation unit, wherein said inert gas is selected from the group consisting of nitrogen, air, water vapor, and combinations thereof; and filtering said precipitates to produce said de-scaled water stream.

10. The method of claim 9, wherein said organic solvent is selected from the group consisting of isopropylamine, propylamine, dipropylamine, diisopropylamine, ethylamine, diethylamine, methylamine, dimethylamine, ammonia, and combinations thereof.

11. The method of claim 9, wherein said magnesium source is selected from the group consisting of dolime, magnesium oxide, magnesium hydroxide, and combinations thereof.

12. The method of claim 1 or 5, wherein said de-carbonated water stream is introduced into a desalination method to produce a distillate stream and a reject brine stream, said desalination method is selected from the group consisting of a recycle-brine multi-stage flash desalination train, a once-through multi-stage flash desalination train, multi-effect distillation, thermal vapor compression, mechanical vapor compression, vacuum membrane distillation, membrane distillation, osmotic membrane distillation, reverse osmosis, nanofiltration, forward osmosis, pervaporation, electrodialysis, and combinations thereof.

13. The method of claim 2 or 6 or 9, wherein said de-scaled water stream is introduced into a desalination method to produce a distillate stream and a reject brine stream, said desalination method is selected from the group consisting of a recycle-brine multi-stage flash desalination train, a once-through multi-stage flash desalination train, multi-effect distillation, thermal vapor compression, mechanical vapor compression, vacuum membrane distillation, membrane distillation, osmotic membrane distillation, reverse osmosis, nanofiltration, forward osmosis, pervaporation, electrodialysis, and combinations thereof.

14. The method of claim 2 or 6 or 9, wherein said de-scaled water stream is introduced into a desalination method, said desalination method comprises a Brine-Forward Multi-Stage Flash (BF-MSF) desalination system, said BF-MSF desalination system comprises a plurality of trains arranges in series, in which each train comprises a brine heater and a heat recovery section except a last train, said last train comprises a brine heater, a heat recovery section and a heat rejection section; wherein said de-scaled water stream is fed to a first train of said BF-MSF desalination system, and wherein each train is operated at a pre-selected concentration factor of brine; wherein each train produces a distillate stream and a brine stream; wherein said brine stream from said each train except said last train passes as a feed stream to the next succeeding train thereby producing an outlet stream having a progressively higher level of total dissolved solids (TDS) than a preceding train; wherein said brine stream from said last train of said BF-MSF desalination system is rejected having a TDS concentration not exceeding 250,000 mg/L of said TDS; wherein said BF-MSF desalination system is a multi-boiling system which does not require additional heat after passing through said brine heater of each train; and a multi-concentration system which does not require supplying additional said de-scaled water stream after said first train.

15. The method of claim 2 or 6 or 9, wherein said de-scaled water stream is further introduced into a desalination method, said desalination method comprises a Brine-Forward Multi-Stage Flash (BF-MSF) desalination system, said BF-MSF desalination system comprises a plurality of trains arranges in series, in which each train comprises a brine heater and a heat recovery section; wherein said de-scaled water stream is fed to a first train of said BF-MSF desalination system, and wherein each train is operated at a pre-selected concentration factor of brine; wherein each train produces a distillate stream and a brine stream; wherein said brine stream from said each train except said last train passes as a feed stream to the next succeeding train thereby producing an outlet stream having a progressively higher level of total dissolved solids (TDS) than a preceding train; wherein said brine stream from said last train of said BF-MSF desalination system is rejected having a TDS concentration not exceeding 250,000 mg/L of said TDS; wherein said BF-MSF desalination system is a multi-boiling system which does not require additional heat after passing through said brine heater of each train; and a multi-concentration system which does not require supplying additional said de-scaled water stream after said first train.

16. The method of claim 2 or 6 or 9, wherein said de-scaled water stream further comprises the steps of contacting at least a slip stream of said de-scaled water stream with flue gas in a scrubber, wherein said scrubber comprises a heat exchanger, and wherein said flue gas is emitted from an accompanying power cycle of a power-desalination co-generation plant; scrubbing said flue gas with said slip stream in said scrubber; condensing said flue gas by passing said de-scaled water stream through heat transfer tubes of said heat exchanger of said scrubber;

whereby absorbing sulfur dioxide from said flue gas, liberating carbon dioxide from said flue gas, generating a spent slip stream from said slip stream, and heating said de-scaled water stream to produce heated and de-scaled water stream.

17. The method of claim 16, comprising the step of filtering said spent slip stream to produce a filtered slip stream.

18. The method of claim 16, wherein said spent slip stream further comprises the steps of re-circulating said spent slip stream through said scrubber, bleeding at least a portion of said spent slip stream, and adding at least a portion of said de-scaled water stream to substitute the bled portion of said spent slip stream.

19. The method of claim 16, wherein said heated and de-scaled water stream is introduced into a desalination method, said desalination method comprises a Brine-Forward Multi-Stage Flash (BF-MSF) desalination system, said BF-MSF desalination system comprises a plurality of trains arranges in series, in which each train comprises a brine heater and a heat recovery section except a last train, said last train comprises a brine heater, a heat recovery section and a heat rejection section; wherein said heated and de-scaled water stream is fed to a first train of said BF-MSF desalination system, and wherein each train is operated at a pre-selected concentration factor of brine; wherein each train produces a distillate stream and a brine stream; wherein said brine stream from said each train except said last train passes as a feed stream to the next succeeding train thereby producing an outlet stream having a progressively higher level of total dissolved solids (TDS) than a preceding train; wherein said brine stream from said last train of said BF-MSF desalination system is rejected having a TDS concentration not exceeding 250,000 mg/L of said TDS; wherein said BF-MSF desalination system is a multi-boiling system which does not require additional heat after passing through said brine heater of each train; and a multi-concentration system which does not require supplying additional said heated and de-scaled water stream after said first train.

20. The method of claim 16, wherein said heated and de-scaled water stream is further introduced into a desalination method, said desalination method comprises a Brine-Forward Multi-Stage Flash (BF-MSF) desalination system, said BF-MSF desalination system comprises a plurality of trains arranges in series, in which each train comprises a brine heater and a heat recovery section; wherein said heated and de-scaled water stream is fed to a first train of said BF-MSF desalination system, and wherein each train is operated at a pre-selected concentration factor of brine; wherein each train produces a distillate stream and a brine stream; wherein said brine stream from said each train except said last train passes as a feed stream to the next succeeding train thereby producing an outlet stream having a progressively higher level of total dissolved solids (TDS) than a preceding train; wherein said brine stream from said last train of said BF-MSF desalination system is rejected having a TDS concentration not exceeding 250,000 mg/L of said TDS; wherein said BF-MSF desalination system is a multi-boiling system which does not require additional heat after passing through said brine heater of each train; and a multi-concentration system which does not require supplying additional said heated and de-scaled water stream after said first train.

21. The method of claim 1 or 5 or 9, wherein said source water containing carbonates and sulfate further comprises the step of passing at least a portion of said source water containing carbonates and sulfate prior to step (i) through heat transfer tubes of a heat rejection section in a train of a desalination method.

* * * * *